United States Patent
Grigorenko et al.

(10) Patent No.: US 12,515,253 B2
(45) Date of Patent: Jan. 6, 2026

(54) COMPOSITIONS, COMPRISING SILVER NANOPLATELETS

(71) Applicant: BASF SE, Ludwigshafen am Rhein (DE)

(72) Inventors: Nikolay A. Grigorenko, Basel (CH); Andre Oswald, Schweizerhalle (CH); Michelle Richert, Basel (CH)

(73) Assignee: BASF SE, Ludwigshafen am Rhein (DE)

( * ) Notice: Subject to any disclaimer, the term of this patent is extended or adjusted under 35 U.S.C. 154(b) by 1081 days.

(21) Appl. No.: 17/608,644

(22) PCT Filed: Apr. 23, 2020

(86) PCT No.: PCT/EP2020/061373
§ 371 (c)(1),
(2) Date: Nov. 3, 2021

(87) PCT Pub. No.: WO2020/224982
PCT Pub. Date: Nov. 12, 2020

(65) Prior Publication Data
US 2022/0220284 A1    Jul. 14, 2022

(30) Foreign Application Priority Data
May 6, 2019   (EP) .................... 19172734

(51) Int. Cl.
| B22F 9/24 | (2006.01) |
| B22F 1/054 | (2022.01) |
| B22F 1/0545 | (2022.01) |
| B22F 1/103 | (2022.01) |
| B22F 1/107 | (2022.01) |
| B42D 25/364 | (2014.01) |
| B42D 25/373 | (2014.01) |
| B42D 25/378 | (2014.01) |
| C08K 3/08 | (2006.01) |
| C08K 9/04 | (2006.01) |
| C09D 7/40 | (2018.01) |
| C09D 7/62 | (2018.01) |

(52) U.S. Cl.
CPC .............. *B22F 9/24* (2013.01); *B22F 1/0545* (2022.01); *B22F 1/0551* (2022.01); *B22F 1/103* (2022.01); *B22F 1/107* (2022.01); *B42D 25/373* (2014.10); *C08K 3/08* (2013.01); *C08K 9/04* (2013.01); *C09D 7/62* (2018.01); *C09D 7/67* (2018.01); *C09D 7/68* (2018.01); *C09D 7/70* (2018.01); *B42D 25/364* (2014.10); *B42D 25/378* (2014.10); *C08K 2003/0806* (2013.01); *C08K 2201/003* (2013.01); *C08K 2201/011* (2013.01)

(58) Field of Classification Search
CPC .............. C09D 7/62; C09D 7/68; C09D 7/67; B24D 25/373; B22F 1/0551; B22F 1/0545; B22F 9/24
See application file for complete search history.

(56) References Cited

U.S. PATENT DOCUMENTS

| 3,862,333 | A | 1/1975 | Chalupa et al. |
| 4,151,175 | A | 4/1979 | Crivello et al. |
| 4,399,071 | A | 8/1983 | Crivello et al. |
| 4,694,029 | A | 9/1987 | Land |
| 6,306,555 | B1 | 10/2001 | Schulz et al. |
| 9,028,724 | B2 | 5/2015 | Son et al. |
| 2011/0319535 | A1 | 12/2011 | Nesvadba et al. |
| 2014/0105982 | A1* | 4/2014 | Oldenburg ........... C09D 129/04 424/618 |
| 2017/0246690 | A1 | 8/2017 | Murphy et al. |

FOREIGN PATENT DOCUMENTS

| EP | 0562897 A1 | 9/1993 |
| EP | 0624826 A1 | 11/1994 |
| EP | 1791702 A2 | 6/2007 |
| EP | 2559786 A1 | 2/2013 |
| EP | 2667990 A1 | 12/2013 |
| EP | 2886343 A1 | 6/2015 |
| EP | 2886356 A2 | 6/2015 |
| EP | 3156156 A1 | 4/2017 |
| EP | 3157697 A1 | 4/2017 |
| WO | 90/01512 A1 | 2/1990 |
| WO | 98/46647 A1 | 10/1998 |
| WO | 2006/074969 A1 | 7/2006 |
| WO | 2009/056401 A1 | 5/2009 |

(Continued)

OTHER PUBLICATIONS

Eric Olson: Particle Shape Factors and Their Use in Image Analysis—Part 1: Theory, Journal of Gxp Compliance, vol. 15, No. 3, Jan. 1, 2011, pp. 85-96.
European Search Report for EP Patent Application No. 19172734.6, Issued on Nov. 14, 2019, 4 pages.
International Preliminary Report on Patentability received for PCT Patent Application No. PCT/EP2020/061373, mailed on Nov. 18, 2021, 9 pages.
International Search Report and Written Opinion received for PCT Patent Application No. PCT/EP2020/061373, mailed on Jul. 6, 2020, 11 pages.
Das, et al., "Effect of stabilizer concentration on the size of silver nanoparticles synthesized through chemical route", Inorganic Chemistry Communications, vol. 123, Jan. 2021, pp. 1-6.

*Primary Examiner* — Pegah Parvini
(74) *Attorney, Agent, or Firm* — Faegre Drinker Biddle & Reath LLP

(57) ABSTRACT

The present invention relates to compositions, comprising silver nanoplatelets, wherein the number mean diameter of the silver nanoplatelets, present in the composition, is in the range of 50 to 150 nm with standard deviation being less than 60% and the number mean thickness of the silver nanoplatelets, present in the composition, is in the range of 5 to 30 nm with standard deviation being less than 50%, wherein the mean aspect ratio of the silver nanoplatelets is higher than 2.0 and the highest wavelength absorption maximum of the population of all silver nanoplatelets in the composition being within the range of 560 to 800 nm. A coating, comprising the composition, shows a blue color in transmission and a metallic yellow color in reflection.

15 Claims, 1 Drawing Sheet

(56) References Cited

FOREIGN PATENT DOCUMENTS

| | | |
|---|---|---|
| WO | 2010/108837 A1 | 9/2010 |
| WO | 2011/064162 A2 | 6/2011 |
| WO | 2013/186167 A2 | 12/2013 |
| WO | 2014/041121 A1 | 3/2014 |
| WO | 2014/118567 A1 | 8/2014 |
| WO | 2014/187750 A1 | 11/2014 |
| WO | 2015/120975 A1 | 8/2015 |
| WO | 2016/091381 A1 | 6/2016 |
| WO | 2016/173695 A1 | 11/2016 |
| WO | 2016/173696 A1 | 11/2016 |
| WO | 2017/008897 A1 | 1/2017 |
| WO | 2017/008905 A2 | 1/2017 |
| WO | 2017/028950 A1 | 2/2017 |
| WO | 2017/054922 A1 | 4/2017 |
| WO | 2017/080641 A1 | 5/2017 |
| WO | 2017/092865 A1 | 6/2017 |
| WO | 2017/114590 A1 | 7/2017 |
| WO | 2020/083794 A1 | 4/2020 |

\* cited by examiner

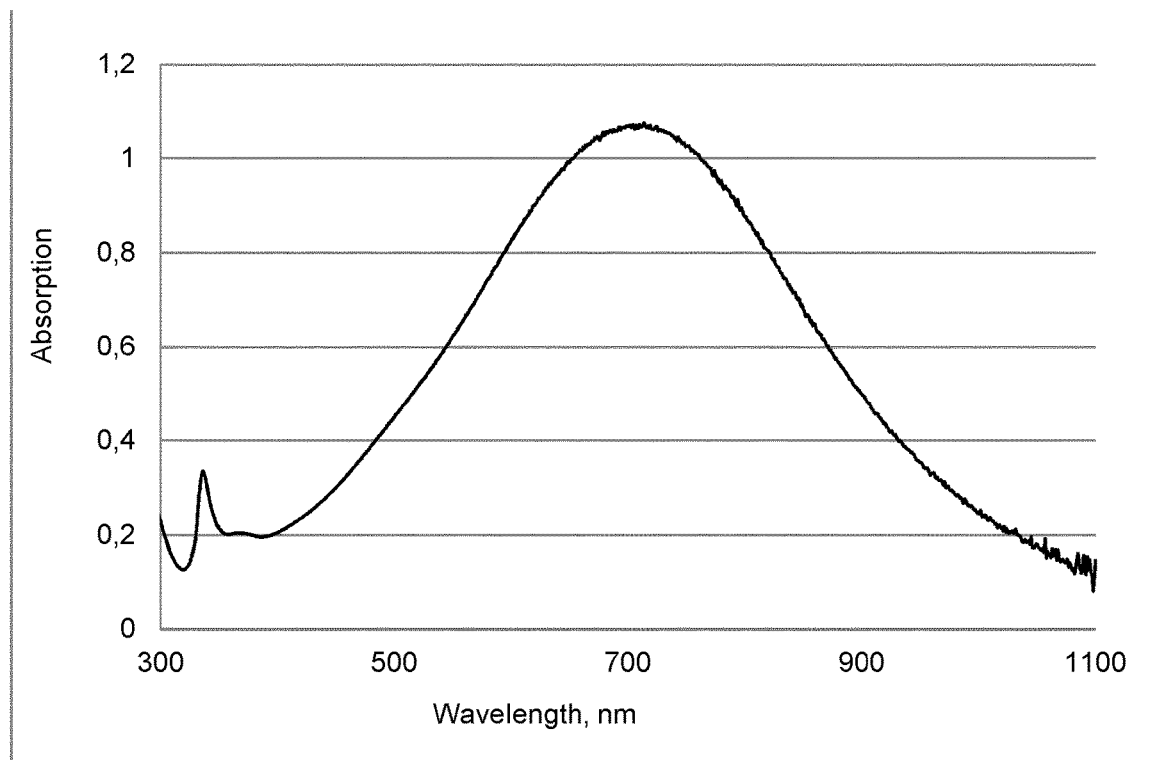

COMPOSITIONS, COMPRISING SILVER NANOPLATELETS

CROSS-REFERENCE TO RELATED APPLICATIONS

This application is a national stage application (under 35 U.S.C. § 371) of PCT/EP2020/061373, filed Apr. 23, 2020, which claims benefit of European Application No. 19172734.6, filed May 6, 2019, both of which are incorporated herein by reference in their entirety.

The present invention relates to compositions, comprising silver nanoplatelets, wherein the number mean diameter of the silver nanoplatelets, present in the composition, is in the range of 50 to 150 nm with standard deviation being less than 60% and the number mean thickness of the silver nanoplatelets, present in the composition, is in the range of 5 to 30 nm with standard deviation being less than 50%, wherein the mean aspect ratio of the silver nanoplatelets is higher than 2.0 and the highest wavelength absorption maximum of the population of all silver nanoplatelets in the composition being within the range of 560 to 800 nm. A coating, comprising the composition, shows a blue color in transmission and a metallic yellow color in reflection.

US2017246690 (EP3157697) discloses a method for synthesizing metal nanoparticles, the method comprising:
(a) preparing a metal precursor mixture comprising a metal precursor compound and a first aqueous liquid medium,
(b) preparing a reducing agent mixture comprising a reducing agent and a second aqueous liquid medium,
(c) optionally adding an acid or a base to the mixture prepared in step (a) or to the mixture prepared in step (b),
wherein the metal precursor mixture and the reducing agent mixture are both free of stabilizing agent and free of seed particles,
(d) combining the metal precursor mixture with the reducing agent mixture so as to allow the metal precursor compound to react with the reducing agent,
thereby synthesizing the metal nanoparticles.

EP3156156 relates to a fine silver particle dispersion, which comprises fine silver particles, a short chain amine having 5 or less carbon atoms and a highly polar solvent, and a partition coefficient log P of the short chain amine is −1.0 to 1.4. The method for producing the fine silver particles of EP3156156 comprises a first step for preparing a mixed liquid of a silver compound which is decomposed by reduction to produce a metal silver, and a short chain amine having a partition coefficient log P of −1.0 to 1.4, and a second step for reducing the silver compound in the mixed liquid to produce a fine silver particle where a short chain amine having 5 or less carbon atoms which is adhered to at least a part of the surface of the particle.

EP2559786 discloses a method comprising:
a) providing a substrate;
b) applying an aqueous catalyst solution to the substrate, the aqueous catalyst solution comprises nanoparticles of one or more metal chosen from silver, gold, platinum, palladium, iridium, copper, aluminum, cobalt, nickel and iron, and one or more stabilizing compounds chosen from gallic acid, gallic acid derivatives and salts thereof, the aqueous catalyst solution is free of tin; and
c) electrolessly depositing metal onto the substrate using an electroless metal plating bath.

U.S. Pat. No. 9,028,724 discloses a method for preparing a dispersion of nanoparticles, comprising: dispersing nanoparticles having hydrophobic ligands on the surface in a hydrophobic solvent to form a first dispersion; mixing the first dispersion with a surface modification solution comprising (a) at least one wetting-dispersing agent selected from polydimethylsilane, alkylol ammonium salt of an acidic polyester and alkylol ammonium salt of a polyacrylic acid, (b) a surfactant, and (c) an aqueous-based solvent to form a first mixture solution; mixing the first mixture solution with a ligand removal agent to form a second mixture solution containing hydrophilic nanoparticles and separating the hydrophilic nanoparticles from the second mixture solution; and dispersing the hydrophilic nanoparticles in an aqueous-based solvent, wherein the nanoparticles comprise one of a metal and a metal oxide.

EP2667990B1 relates to a process comprising:
forming an insoluble complex of a metal salt from a reaction mixture comprising a solvent, a first surfactant, a second surfactant, and a third surfactant, each surfactant being present in the insoluble complex of the metal salt, and
reacting the insoluble complex of the metal salt with a reducing agent in the reaction mixture to form metal nanoparticles;
wherein the first surfactant comprises a primary amine, the second surfactant comprises a secondary amine, and the third surfactant comprises a chelating agent comprising N,N'-dialkylethylenediamine.

EP1791702B9 relates to an ink for ink-jet printing or digital printing comprising a vehicle and metallic particles having a weight average particle size of from 40 nm to 1 micrometres, preferably from 50 nm to 500 nm, wherein the loading of metallic nanoparticles in the ink is comprised between 2 percent by weight and 75 percent by weight, preferably from 2 percent to 40 percent by weight, and the viscosity of the ink is comprised between 10 and 40 cP.

WO09/056401 relates to a method for the synthesis, isolation and re-dispersion in organic matrixes of nano-shaped transition metal particles, selected from the group consisting of Zn, Ag, Cu, Au, Ta, Ni, Pd, Pt, Co, Rh, Ir, Fe, Ru, and Ti, comprising
a) adding to an aqueous solution of the transition metal salt an acrylate or methacrylate monomer or oligomer, or a polyacrylate or polymethacrylate and a reducing agent;
b1) treating the colloidal solution with a peroxide; or
b2) exposing the colloidal solution to UV- or visible light;
c) adding a water soluble amine; and
d) isolating the nano-shaped transition metal particles or re-disperse the nano shaped transition metal particles together with a dispersing agent in a liquid acrylate or methacrylate monomer.

WO2010108837 relates to a method of manufacturing shaped transition metal particles in the form of nanoplatelets, which metal is selected from the group consisting of Cu, Ag, Au, Zn, Cd, Ti, Cr, Mn, Fe, Co, Ni, Ru, Rh, Pd, Os, Ir and Pt, which method comprises the steps of first a) adding a reducing agent to an aqueous mixture comprising a transition metal salt and a polymeric dispersant, and subsequently b) treating the obtained colloidal dispersion with a peroxide, wherein the aqueous mixture in step a) comprises the transition metal salt in a concentration of higher than 2 mmol per liter.

WO11064162 relates to security, or decorative element, comprising a substrate, which may contain indicia or other visible features in or on its surface, and on at least part of the said substrate surface, a coating comprising platelet shaped transition metal particles having a longest dimension of edge length of from 15 nm to 1000 nm, preferably from 15 nm to 600 nm and particularly from 20 nm to 500 nm, and a thickness of from 2 nm to 100 nm, preferably from 2 to 40 nm and particularly from 4 to 30 nm and a method for forming for forming an optically variable image (an optically variable device) on a substrate comprising the steps of: forming an optically variable image (OVI) on a discrete portion of the substrate; and depositing a coating composition comprising platelet shaped transition metal particles having a longest dimension of edge length of from 15 nm to 1000 nm, preferably from 15 nm to 600 nm and particularly from 20 nm to 500 nm, and a thickness of from 2 nm to 100 nm, preferably from 2 to 40 nm and particularly from 4 to 30 nm and a binder on at least a portion of the OVI.

WO2013/186167 discloses a method for forming a surface relief microstructure, especially an optically variable image (an optically variable device, OVD) on a substrate comprising the steps of:

A) applying a curable composition to at least a portion of the substrate wherein the curable composition comprises
  a1) at least one ethylenically unsaturated resin, a monomer or a mixture thereof;
  a2) at least one photoinitiator; and
  a3) a metal pigment which is in the form of platelet shaped transition metal particles having a longest dimension of edge length of from 5 nm to 1000 nm, preferably from 7 nm to 600 nm and particularly from 10 nm to 500 nm, and a thickness of from 1 nm to 100 nm, preferably from 2 to 40 nm and particularly from 3 to 30 nm;
B) contacting at least a portion of the curable composition with a surface relief microstructure, especially optically variable image forming means;
C) curing the composition by using at least one UV lamp.

WO2014/041121 and WO2014/187750 relates to a security elements, comprising a coating comprising platelet shaped transition metal particles having a longest dimension of edge length of from 15 nm to 1000 nm, preferably from 15 nm to 600 nm and particularly from 20 nm to 500 nm, and a thickness of from 2 nm to 100 nm, preferably from 2 to 40 nm and particularly from 4 to 30 nm.

EP18202669.0 relates to compositions, comprising silver nanoplatelets, wherein the mean diameter of the silver nanoplatelets, present in the composition, is in the range of 20 to 70 nm with standard deviation being less than 50% and the mean thickness of the silver nanoplatelets, present in the composition, is in the range of 5 to 30 nm with standard deviation being less than 50%, wherein the mean aspect ratio of the silver nanoplatelets is higher than 1.5, a process for its production, printing inks containing the compositions and their use in security products. The highest wavelength absorption maximum of the population of all silver nanoplatelets in the composition being within the range of 450 to 550 nm. A coating, comprising the composition, shows a red, or magenta color in transmission and a greenish-metallic color in reflection.

It has now been found, surprisingly, that silver nanoplatelets with particular surface stabilizing agents and a high molar extinction coefficient can be synthesized in an economically efficient way at a high concentration of silver in the reaction mixture. These surface stabilizing agents provide high colloidal stability to the silver particles, which prevents agglomeration and sedimentation upon storage. Furthermore, additional stabilization agents can be used to improve the stability of optical properties of the silver nanoplatelets upon storage or heat exposure. Silver nanoplatelets prepared in this way possess rather uniform diameter and thickness and can be formulated in solvent based inks with different solvents and binders, which upon printing exhibit blue color in transmission and metallic yellow color in reflection.

Accordingly, the present application relates to compositions, comprising silver nanoplatelets, wherein the number mean diameter of the silver nanoplatelets, present in the composition, is in the range of 50 to 150 nm with standard deviation being less than 60% and the number mean thickness of the silver nanoplatelets, present in the composition, is in the range of 5 to 30 nm with standard deviation being less than 50%, wherein the mean aspect ratio of the silver nanoplatelets is higher than 2.0 and the highest wavelength absorption maximum of the population of all silver nanoplatelets in the composition being within the range of 560 to 800 nm.

The mean aspect ratio of the silver nanoplatelets is higher than 2.0.

FIG. 1 shows the UV-Vis spectrum of the composition, comprising the silver nanoplatelets, obtained in Example 1 b4).

The silver nanoplatelets may be in the form of disks, regular hexagons, triangles, especially equilateral triangles, and truncated triangles, especially truncated equilateral triangles, or mixtures thereof. They are preferably in the form of disks, truncated triangles, hexagons, or mixtures thereof.

The term "silver nanoplatelets" is a term used in the art and as such is understood by the skilled person. In the context of the present invention, silver nanoplatelets are preferably any silver nanoplatelets having a number mean diameter in the range of 50 to 150 nm and a number mean thickness in the range of 5 to 30 nm, the mean aspect ratio being higher than 2.0.

In the context of the present invention, a "surface modified silver nanoplatelet (nanoparticle)" is a silver nanoplatelet (nanoparticle) having attached to its surface one or more (surface) stabilizing agents.

Accordingly, the present invention relates to surface modified silver nanoplatelets which bear a surface stabilizing agent of formula (I) and optionally further stabilizing agents described below on their surface.

The number mean diameter of the silver nanoplatelets is in the range of 50 to 150 nm, preferably 60 to 140 nm, more preferably 70 to 120 nm. The standard deviation being less than 60%, preferably less than 50%.

The number mean thickness of the silver nanoplatelets is in the range of 5 to 30 nm, preferably 7-25 nm, more preferably 8 to 25 nm. The standard deviation being less than 50%, preferably less than 30%.

The diameter is the longer side of the nanoplatelet (width). The thickness is the shorter side of the nanoplatelet (height).

The mean aspect ratio (defined as the ratio of number mean diameter to number mean thickness) being larger than 2.0, preferably larger than 2.2 and more preferably larger than 2.5.

The aspect ratio of the nanoplatelets is the ratio of its longest dimension, such as, for example, its diameter to its shortest dimension, such as, for example, its thickness. For example, the aspect ratio of a disk is the ratio of its diameter to its thickness.

In a particularly preferred embodiment the number mean diameter of the silver nanoplatelets is in the range of 70 to 120 nm with standard deviation being less than 50% and the number mean thickness of the silver nanoplatelets is in the range of 8 to 25 nm with standard deviation being less than 30%. The mean aspect ratio of the silver nanoplatelets is higher than 2.5.

The highest wavelength absorption maximum of the population of all silver nanoplatelets in the composition being within the range of 560 to 800 nm, preferably 580 to 800 nm, most preferably 600 to 800 nm (measured in water at ca. 5*10-5 M (mol/l) concentration of silver).

The absorption maximum has a full width at half maximum (FWHM) value in the range of 50 to 500 nm, preferably 70 to 450 nm, more preferably 80 to 450 nm.

The molar extinction coefficient of silver nanoplatelets, measured at the highest wavelength absorption maximum of the population of all silver nanoplatelets in the composition, is higher than 4000 L/(cm*mol$_{Ag}$), especially higher than 5000 L/(cm*mol$_{Ag}$), very especially higher than 6000 L/(cm*mol$_{Ag}$).

In a preferred embodiment of the present invention the silver nanoplatelets bear a surface stabilizing agent of formula (I)

$$R^1\!\!\left[\!O\!\underset{R^3}{\overset{R^2}{\rightthreetimes}}\!\right]_{k1}\!\!\left[\!O\!\underset{R^4}{\overset{R^5}{\rightthreetimes}}\!\right]_{k2}\!\!\left[\!O\!\underset{R^7}{\overset{R^6}{\rightthreetimes}}\!\right]_{k3}\!\!\left[\!Y\!\underset{O}{\overset{\|}{C}}\right]_{k4}\!\!\left[\vphantom{X}\right]_{k5}\!\!S\text{-----}$$

on their surface, wherein ----------- indicates the bond to the silver,

R$^1$ is H, C$_1$-C$_{18}$alkyl, phenyl, C$_1$-C$_8$alkylphenyl, or CH$_2$COOH;

R$^2$, R$^3$, R$^4$, R$^5$, R$^6$ and R$^7$ are independently of each other H, C$_1$-C$_8$alkyl, or phenyl;

Y is O, or NR$^8$;

R$^8$ is H, or C$_1$-C$_8$alkyl;

k1 is an integer in the range of from 1 to 500, k2 and k3 are independently of each other 0, or integers in the range of from 1 to 250;

k4 is 0, or 1, k5 is an integer in the range of from 1 to 5.

Y is preferably O. k4 is preferably 0.

The surface stabilizing agent of formula (I) has preferably a number average molecular weight of from 1000 to 20000, and more preferably from 1000 to 10000, most preferred from 1000 to 6000. All molecular weights specified in this text have the unit of [g/mol] and refer, unless indicated otherwise, to the number average molecular weight (Mn).

If the compounds comprise, for example, ethylene oxide units (EO) and propylene oxide units (PO), the order of (EO) and (PO) may be fixed (block copolymers), or may not be fixed (random copolymers).

Preferably, R$^1$ is H, or C$_1$-C$_{18}$alkyl; R$^2$, R$^3$, R$^4$, R$^5$, R$^6$ and R$^7$ are independently of each other H, CH$_3$, or C$_2$H$_5$; k1 is 22 to 450, k2 and k3 are independently of each other 0, or integers in the range of from 1 to 250; k4 is 0, or 1; and k5 is an integer in the range of from 1 to 5.

More preferred, R$^1$ is H, or C$_1$-C$_4$alkyl; R$^2$, R$^3$, R$^4$, R$^5$, R$^6$ and R$^7$ are independently of each other H, or CH$_3$; k1 is 22 to 450; k2 and k3 are independently of each other 0, or integers in the range of from 1 to 100; k4 is 0; k5 is an integer in the range of from 1 to 4.

The most preferred surface stabilizing agent has the formula

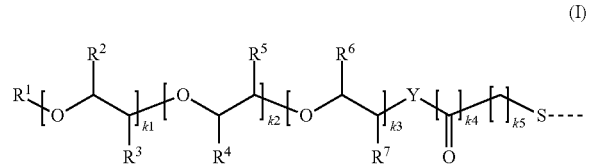

(Ia)

wherein R$^1$ is H, or a C$_1$-C$_8$alkyl group, and k1 is 22 to 450, especially 22 to 150.

R$^1$ is preferably H, or CH$_3$.

The preferred surface stabilizing agents are derived from MPEG thiols (poly(ethylene glycol) methyl ether thiols) having an average M$_n$ of 2000 to 6000, such as, for example, MPEG 2000 thiol (A-1, average M$_n$ 2,000), MPEG 3000 thiol (A-2), MPEG 4000 thiol (A-3) MPEG 5000 thiol (A-4), MPEG 6000 thiol (A-5), PEG thiols (O-(2-mercaptoethyl)-poly(ethylene glycol)) having an average M$_n$ of 2000 to 6000, such as, for example, PEG 2000 thiol (A-6, average M$_n$ 2,000), PEG 3000 thiol (A-7), PEG 4000 thiol (A-8), PEG 5000 thiol (A-9), PEG 6000 thiol (A-10).

In another preferred embodiment of the present invention the silver nanoplatelets bear a surface stabilizing agent which is a polymer, or copolymer described in WO200674969, which can be obtained by a process comprising the steps i1) polymerizing in a first step one or more ethylenically unsaturated monomers in the presence of at least one nitroxylether having the structural element $$\overset{\diagdown}{\underset{\diagup}{N}}\!\!-\!O\!-\!X,$$

wherein X represents a group having at least one carbon atom and is such that the free radical X• derived from X is capable of initiating polymerization; or i2) polymerizing in a first step one or more ethylenically unsaturated monomers in the presence of at least one stable free nitroxyl radical $$\overset{\diagdown}{\underset{\diagup}{N}}\!\!-\!O\!\bullet$$

and a free radical initiator;

wherein at least one monomer used in the steps i1) or i2) is a C$_1$-C$_6$ alkyl or hydroxy C$_1$-C$_6$ alkyl ester of acrylic or methacrylic acid; and optionally ii) a second step, comprising the modification of the polymer or copolymer prepared under i1) or i2) by a transesterification reaction, an amidation, hydrolysis or anhydride modification or a combination thereof.

The monomer in step i1) or i2) is preferably selected from 4-vinyl-pyridine or pyridinium-ion, 2-vinyl-pyridine or pyridinium-ion, 1-vinyl-imidazole or imidazolinium-ion, or a compound of formula CH$_2$=C(R$_a$)—(C=Z)—R$_b$, wherein R$_a$ is hydrogen or methyl, R$_b$ is NH$_2$, O—(Me*), unsubstituted C$_1$-C$_{18}$alkoxy, C$_2$-C$_{100}$alkoxy interrupted by at least one N and/or O atom, or hydroxy-substituted C$_1$-C$_{18}$alkoxy, unsubstituted C$_1$-C$_{18}$alkylamino, unsubstituted di(C$_1$-C$_{18}$alkyl)amino, hydroxy-substituted C$_1$-C$_{18}$alkylamino or hydroxy-substituted di(C$_1$-C$_{18}$alkyl)amino, —O—(CH$_2$)$_y$NR$^{15}$R$^{16}$, or —O—(CH$_2$)$_y$NHR$^{15}$R$^{16+}$ An$^-$, —N—(CH$_2$)$_y$NR$^{15}$R$^{16}$, or —N—(CH$_2$)NHR$^{15}$R$^{16+}$ An$^-$, wherein $An^-$ is an anion of a monovalent organic, or inorganic acid;

y is an integer from 2 to 10;

$R^{15}$ is saturated or unsaturated, linear or branched chain alkyl with 1-22 carbon atoms, $R^{16}$ is saturated or unsaturated, linear or branched chain alkyl with 1-22 carbon atoms, Me is a monovalent metal atom or the ammonium ion.

Z is oxygen or sulfur.

The second step ii) is preferably a transesterification reaction.

In step ii) the alcohol is preferably an ethoxylate of formula $R_A$—[O—$CH_2$—$CH_2$—]$_{n1}$—OH (A), wherein $R_A$ is saturated or unsaturated, linear or branched chain alkyl with 1-22 carbon atoms, or alkylaryl or dialkylaryl with up to 24 carbon atoms and n1 is 1 to 150.

Preferably, step i1) or i2) is carried out twice and a block copolymer is obtained wherein in the first or second radical polymerization step the monomer or monomer mixture contains 50 to 100% by weight, based on total monomers, of a $C_1$-$C_6$ alkyl ester of acrylic or methacrylic acid and in the second or first radical polymerization step respectively, the ethylenically unsaturated monomer or monomer mixture contains at least a monomer without primary or secondary ester bond.

In the first polymerization step the monomer or monomer mixture contains from 50 to 100% by weight based on total monomers of a $C_1$-$C_6$ alkyl ester of acrylic or methacrylic acid (first monomer) and in the second polymerization step the ethylenically unsaturated monomer or monomer mixture comprises 4-vinyl-pyridine or pyridinium-ion, 2-vinyl-pyridine or pyridinium-ion, vinyl-imidazole or imidazolinium-ion, 3-dimethylaminoethylacrylamide, 3-dimethylaminoethylmethacrylamide, or corresponding ammonium ion, 3-dimethylaminopropylacrylamide, or corresponding ammonium ion, or 3-dimethylaminopropylmethacrylamide, or corresponding ammonium ion (second monomer).

The nitroxylether is preferably a compound of formula

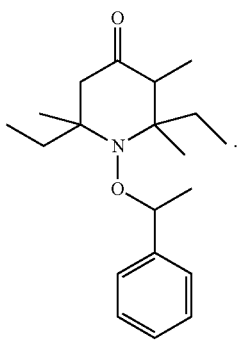 [SMILES: CCC1(C)CC(=O)C(C)C(C)(CC)N1OC(C)c1ccccc1]

(O1)

The surface stabilization agent is preferably a copolymer which can be obtained by a process comprising the steps i1) polymerizing in a first step a first monomer, which is a $C_1$-$C_6$ alkyl or hydroxy $C_1$-$C_6$ alkyl ester of acrylic or methacrylic acid, and a second monomer which is selected from selected from 4-vinyl-pyridine or pyridinium-ion, 2-vinyl-pyridine or pyridinium-ion, 1-vinyl-imidazole or imidazolinium-ion, 3-dimethylaminoethylacrylamide, 3-dimethylaminoethylmethacrylamide 3-dimethylaminopropylacrylamide, and 3-dimethylaminopropylmethacrylamide; in the presence of at least one nitroxylether having the structural element

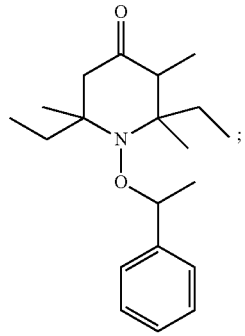

and ii) a second step, comprising the modification of the polymer or copolymer prepared under i) or ii) by a transesterification reaction, wherein the alcohol in step ii) is an ethoxylate of formula $R_A$—[O—$CH_2$—$CH_2$—]$_{n1}$—OH (A), wherein $R_A$ is saturated or unsaturated, linear or branched chain alkyl with 1-22 carbon atoms, or alkylaryl or dialkylaryl with up to 24 carbon atoms and n1 is 1 to 150.

Copolymers represented by formula

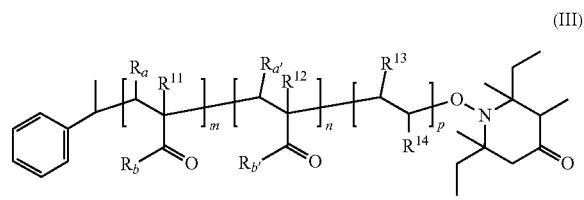

(III)

are preferred, wherein $R^{11}$ and $R^{12}$ are H or methyl, $R^{13}$, $R_a$ and $R_{a'}$ are independently of each other H or methyl, $R_b$ is saturated or unsaturated, linear or branched chain alkyl with 1-22 carbon atoms, $R_{b'}$ is $R_A$—[O—$CH_2$—$CH_2$—]$_{n1}$—O—, $R^{14}$ is

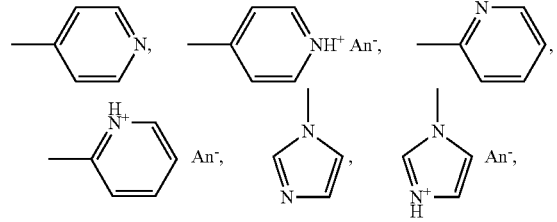

—C(=O)—N—$(CH_2)_y$$NR^{15}R^{16}$, or —C(=O)—N—$(CH_2)_y$$NHR^{15}R^{16+}$ $An^-$, wherein $An^-$ is an anion of a monovalent organic, or inorganic acid;

y is an integer from 2 to 10;

$R^{15}$ is saturated or unsaturated, linear or branched chain alkyl with 1-22 carbon atoms, $R^{16}$ is saturated or unsaturated, linear or branched chain alkyl with 1-22 carbon atoms, $R_4$ is saturated or unsaturated, linear or branched chain alkyl with 1-22 carbon atoms, or alkylaryl or dialkylaryl with up to 24 carbon atoms and n1 is 1 to 150, m, n and p are independently of each other integers from 1 to 200, and is an integer from 1 to 150.

Copolymers represented by formula

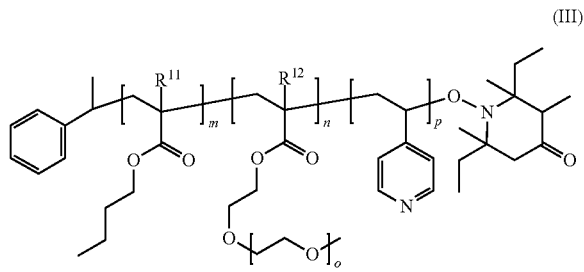

(III)

are more preferred, where $R^{11}$ and $R^{12}$ are H or methyl, m, n and p are independently of each other integers from 1 to 200, o is an integer from 1 to 150, especially an integer from 1 to 149. The order of monomers with indices m and n may be fixed (block copolymers) or not fixed (random copolymers).

Examples of preferred copolymers are the copolymers described in Example A3 (D-1), Example A6 (D-2) of WO200674969.

In addition to the surface stabilizing agents the composition may comprise further stabilizing agents. Stabilizing agents may include, for example, phosphines; phosphine oxides; alkyl phosphonic acids; oligoamines, such as ethylenediamine, diethylene triamine, triethylene tetramine, spermidine, spermine; compounds of formula (IIa), (IIb), (IIc) and (IId) described below; surfactants; dendrimers, and salts and combinations thereof.

Surfactants include, for example, anionic surfactants, cationic surfactants, nonionic surfactants, amphoteric or zwitterionic surfactants.

Anionic surfactants include, for example, alkyl sulfates (eg., dodecylsulfate), alkylamide sulfates, fatty alcohol sulfates, secondary alkyl sulfates, paraffin sulfonates, alkyl ether sulfates, alkylpolyglycol ether sulfates, fatty alcohol ether sulfates, alkylbenzenesulfonates, alkylphenol ether sulfates, alkyl phosphates; alkyl or alkylaryl monoesters, diesters, and triesters of phosphoric acid; alkyl ether phosphates, alkoxylated fatty alcohol esters of phosphoric acid, alkylpolyglycol ether phosphates (for example, polyoxyethylene octadecenyl ether phosphates marketed as LUBRHOPHOS® LB-400 by Rhodia), phosphonic esters, sulfosuccinic diesters, sulfosuccinic monoesters, alkoxylated sulfosuccinic monoesters, sulfosuccinimides, a-olefinsulfonates, alkyl carboxylates, alkyl ether carboxylates, alkyl-polyglycol carboxylates, fatty acid isethionate, fatty acid methyltauride, fatty acid sarcoside, alkyl sulfonates (eg., 2-(methyloleoylamino)ethane-1-sulfonate, marketed as GEROPON® T77 by Solvay) alkyl ester sulfonates, arylsulfonates (eg., diphenyl oxide sulfonate, marketed as RHODACAL® DSB by Rhodia), naphthalenesulfonates, alkyl glyceryl ether sulfonates, polyacrylates, a-sulfo-fatty acid esters, and salts and mixtures thereof.

Cationic surfactants include, for example, aliphatic, cycloaliphatic or aromatic primary, secondary and tertiary ammonium salts or alkanolammonium salts; quaternary ammonium salts, such as tetraoctylammonium halides and cetyltrimethylammonium halides (eg., cetyltrimethylammonium bromide (CTAB)); pyridinium salts, oxazolium salts, thiazolium salts, salts of amine oxides, sulfonium salts, quinolinium salts, isoquinolinium salts, tropylium salts.

Other cationic surfactants suitable for use according to the present disclosure include cationic ethoxylated fatty amines. Examples of cationic ethoxylated fatty amines include, but are not limited to, ethoxylated oleyl amine (marketed as RHODAMEEN® PN-430 by Solvay), hydrogenated tallow amine ethoxylate, and tallow amine ethoxylate.

Nonionic surfactants include, for example, alcohol alkoxylates (for example, ethoxylated propoxylated $C_8$-$C_{10}$ alcohols marketed as ANTAROX® BL-225 and ethoxylated propoxylated $C_{10}$-$C_{16}$ alcohols marketed as ANTAROX® RA-40 by Rhodia), fatty alcohol polyglycol ethers, fatty acid alkoxylates, fatty acid polyglycol esters, glyceride monoalkoxylates, alkanolamides, fatty acid alkylolamides, alkoxylated alkanol-amides, fatty acid alkylolamido alkoxylates, imidazolines, ethylene oxide-propylene oxide block copolymers (for example, EO/PO block copolymer marketed as ANTAROX® L-64 by Rhodia), alkylphenol alkoxylates (for example, ethoxylated nonylphenol marketed as IGEPAL® CO-630 and ethoxylated dinonylphenol/nonylphenol marketed as IGEPAL® DM-530 by Rhodia), alkyl glucosides, alkoxylated sorbitan esters (for example, ethoxylated sobitan monooleate marketed as ALKAMULS® PSMO by Rhodia), alkyl thio alkoxylates (for example, alkyl thio ethoxylates marketed as ALCODET® by Rhodia), amine alkoxylates, and mixtures thereof.

Typically, nonionic surfactants include addition products of ethylene oxide, propylene oxide, styrene oxide, and/or butylene oxide onto compounds having an acidic hydrogen atom, such as, for example, fatty alcohols, alkylphenols or alcohols. Examples are addition products of ethylene oxide and/or propylene oxide onto linear or branched fatty alcohols having from 1 to 35 carbon atoms, onto fatty acids having from 6 to 30 carbon atoms and onto alkylphenols having from 4 to 35 carbon atoms in the alkyl group; ($C_6$-$C_{30}$)-fatty acid monoesters and diesters of addition products of ethylene oxide and/or propylene oxide onto glycerol; glycerol monoesters and diesters and sorbitan monoesters, diesters and triesters of saturated and unsaturated fatty acids having from 6 to 22 carbon atoms and their ethylene oxide and/or propylene oxide addition products, and the corresponding polyglycerol-based compounds; and alkyl monoglycosides and oligoglycosides having from 8 to 22 carbon atoms in the alkyl radical and their ethoxylated or propoxylated analogues. Amphoteric or zwitterionic surfactants include, but are not limited to, aliphatic quaternary ammonium, phosphonium, and sulfonium compounds, wherein the aliphatic radicals can be straight chain or branched, and wherein the aliphatic substituents contains about 6 to about 30 carbon atoms and at least one aliphatic substituent contains an anionic functional group, such as carboxy, sulfonate, sulfate, phosphate, phosphonate, and salts and mixtures thereof. Examples of zwitterionic surfactants include, but are not limited to, alkyl betaines, alkyl amidopropyl betaines, alkyl sulphobetaines, alkyl glycinates, alkyl carboxyglycinates; alkyl amphopropionates, such as cocoamphopropionate and caprylamphodipropionate (marketed as MIRANOL® JBS by Rhodia); alkyl amidopropyl hydroxysultaines, acyl taurates, and acyl glutamates, wherein the alkyl and acyl groups have from 6 to 18 carbon atoms, and salts and mixtures thereof.

The stabilizing agent may be a compound of formula R$^{20}$—X (IIa), wherein R$^{20}$ is a linear or branched C$_1$-C$_{25}$alkyl group, or C$_1$-C$_{25}$alkenyl group, which may be substituted by one, or more groups selected from —OH, —SH, —NH$_2$, or —COOR$^{19}$, wherein R$^{19}$ is a hydrogen atom, or a C$_1$-C$_{25}$alkyl group, and X is —OH, —SH, —NH$_2$, or —COOR$^{19'}$, wherein R$^{19'}$ is a hydrogen atom, a C$_1$-C$_{25}$alkyl group, or a C$_2$-C$_{25}$alkenyl group, which may be substituted by one, or more groups selected from —OH, —SH, —NH$_2$, or —COOR$^{19''}$, wherein R$^{19''}$ is a hydrogen atom, or a C$_1$-C$_{25}$alkyl group.

Examples of compounds of formula (IIa) are 1-methylamine, 1-dodecylamine, 1-hexadecylamine, citric acid, oleic acid, D-cysteine, 1-dodecanethiol, 9-mercapto-1-nonanol, 1-thioglycerol, 11-amino-1-undecanethiol, cysteamine, 3-mercaptopropanoic acid, 8-mercaptooctanoic acid and 1,2-ethanedithiol.

The stabilizing agent may be a compound of formula

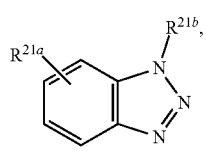

(IIb)

wherein
R$^{21a}$ is a hydrogen atom, a halogen atom, a C$_1$-C$_8$alkoxy group, or a C$_1$-C$_8$alkyl group,
R$^{21b}$ is a hydrogen atom, or a group of formula —CHR$^{24}$—N(R$^{22}$)(R$^{23}$),
R$^{22}$ and R$^{23}$ are independently of each other a C$_1$-C$_8$alkyl, a hydroxyC$_1$-C$_8$alkyl group, or a group of formula —[(CH$_2$CH$_2$)—O]$_{n1}$—CH$_2$CH$_2$—OH, wherein n1 is 1 to 5, R$^{24}$ is H or C$_1$-C$_8$alkyl.

Examples of compounds of formula (IIb) are

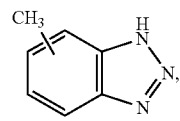

(B-1)

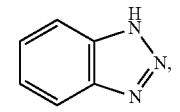

(B-2)

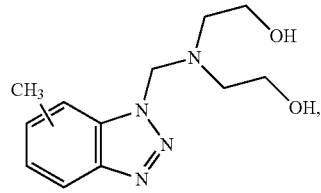

(B-3)

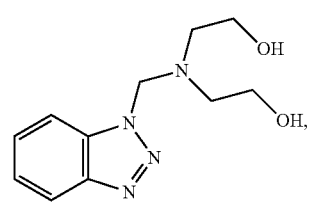

(B-4)

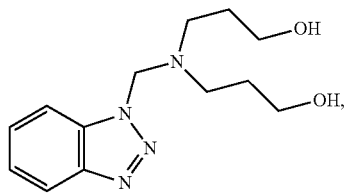

(B-5)

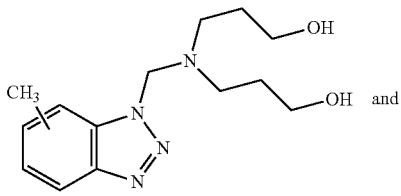

(B-6)

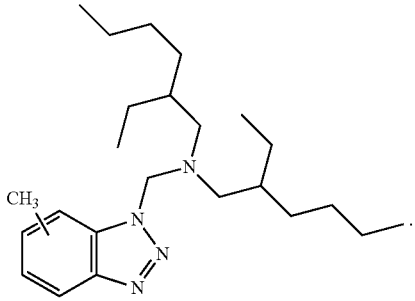

(B-7)

In another preferred embodiment the stabilizing agent is a "polyhydric phenol", which is a compound, containing an optionally substituted benzene ring and at least 2 hydroxy groups attached to it. The term "polyhydric phenol" comprises polyphenols, such as, for example, tannic acid and polycyclic aromatic hydrocarbons which consist of fused benzene rings, wherein at least one benzene ring has at least 2 hydroxy groups attached to it, such as, for example, 1,2-dihydroxynaphthalene. The "polyhydric phenol" may be substituted. Suitable substituents are described below.

The polyhydric phenol is preferably a compound of formula

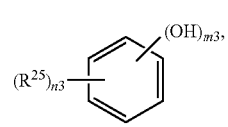

(IIc)

wherein R$^{25}$ can be the same, or different in each occurrence and is a hydrogen atom, a halogen atom, a C$_1$-C$_{18}$alkyl group, a C$_1$-C$_{18}$alkoxy group, or a group —C(=O)—R$^{26}$, R$^{26}$ is a hydrogen atom, a hydroxy group, a C$_1$-C$_{18}$alkyl group, unsubstituted or substituted amino group, unsubstituted or substituted phenyl group, or a C$_1$-C$_{18}$alkoxy group, and n3 is a number of 1 to 4, m3 is a number of 2 to 4, and the sum of m3 and n3 is 6.

The polyhydric phenol is more preferably a compound of formula

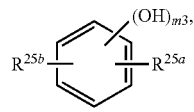

(IIc')

wherein
R$^{25a}$ and R$^{25b}$ are independently of each other a hydrogen atom, a C$_1$-C$_{18}$alkyl group, a C$_1$-C$_{18}$alkoxy group, or a group of formula -C(=O)—R$^{26}$,
R$^{26}$ is a hydrogen atom, a hydroxy group, a C$_1$-C$_{18}$alkyl group, an unsubstituted or substituted amino group, unsubstituted or substituted phenyl group, or a C$_1$-C$_{18}$alkoxy group, and
m3 is a number of 2 to 4, especially 2 to 3. Polyhydric phenols are preferred, which have two hydroxy groups in ortho-position.

Even more preferably, the polyhydric phenol is a compound of formula

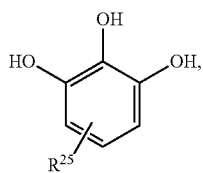

(IIca)

wherein R$^{25}$ is a hydrogen atom, or a group of formula —C(=O)—R$^{26}$, wherein R$^{26}$ is a hydrogen atom, a C$_1$-C$_{18}$alkyl group, or a C$_1$-C$_{18}$alkoxy group, an unsubstituted or substituted amino group, especially a C$_1$-C$_{18}$alkyl group or C$_1$-C$_8$alkoxy group.

Most preferred, the polyhydric phenol is a compound of formula

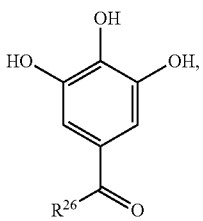

(IIca')

wherein R$^{26}$ is a hydrogen atom, a C$_1$-C$_{18}$alkyl group, or a C$_1$-C$_{18}$alkoxy group, especially a C$_1$-C$_8$alkoxy group, such as, for example,

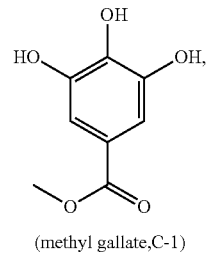

(methyl gallate, C-1)

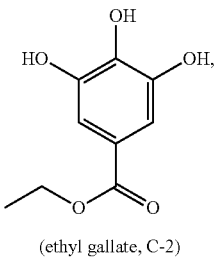

(ethyl gallate, C-2)

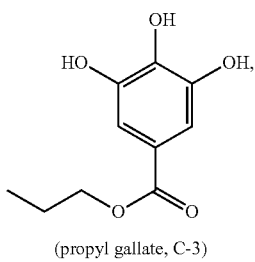

(propyl gallate, C-3)

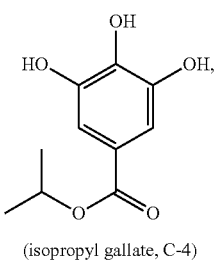

(isopropyl gallate, C-4)

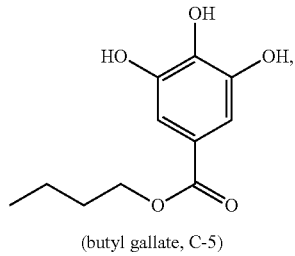

(butyl gallate, C-5)

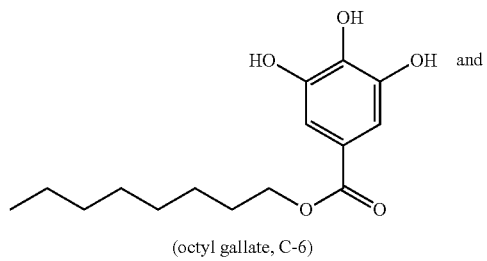

(octyl gallate, C-6)

and

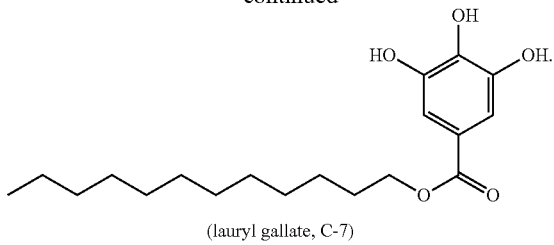

(lauryl gallate, C-7)

In another preferred embodiment of the present invention the polyhydric phenols are compounds of formula

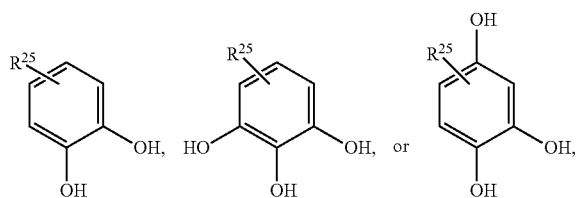

wherein $R^{25}$ is a hydrogen atom, a $C_1$-$C_{18}$alkyl group, or a group of formula —C(=O)—$R^{26}$, wherein $R^{26}$ is a hydrogen atom, a hydroxy group, a $C_1$-$C_{18}$alkyl group, or a $C_1$-$C_{18}$alkoxy group, an unsubstituted or substituted amino group, an unsubstituted or substituted phenyl group, especially a $C_1$-$C_{18}$alkyl group or $C_1$-$C_8$alkoxy group, such as, for example,

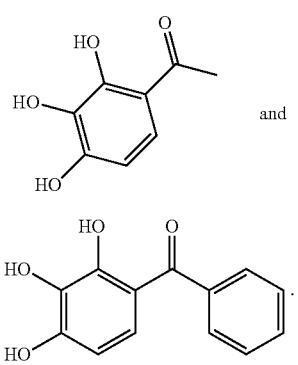

An unsubstituted or substituted amino group is, for example, a group of formula —$NR^{27}R^{28}$ wherein $R^{27}$ and $R^{28}$ are independently of each other a hydrogen atom, a $C_1$-$C_{18}$alkyl group, a phenyl group, preferably a hydrogen atom, or a $C_1$-$C_{18}$alkyl group.

In another preferred embodiment the stabilizing agent is a dithiocarbamate salt, especially a dithiocarbamate salt of formula

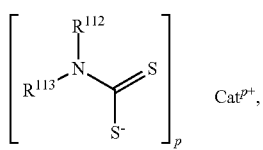

(IId)

wherein
$R^{112}$ and $R^{113}$ are independently of each other a $C_1$-$C_{18}$alkyl group, a $C_2$-$C_{18}$alkyl group substituted with a hydroxy group; a $C_3$-$C_{18}$alkenyl group, a $C_3$-$C_{12}$cycloalkyl group, a $C_6$-$C_{12}$aryl group, which may be substituted by one, or more $C_1$-$C_4$alkyl groups, or $C_1$-$C_4$alkoxy groups; $C_2$-$C_{12}$heteroaryl group, which may be substituted by one, or more $C_1$-$C_4$alkyl groups, or $C_1$-$C_4$alkoxy groups; or a $C_7$-$C_{18}$aralkyl group; or $R^{112}$ and $R^{113}$ together with the nitrogen atom, to which they are bound, form a heterocycle, such as, for example, a piperidine ring; and $Cat^{p+}$ is selected from the group of $H^+$, an alkali metal cation (e.g. sodium, or potassium), an alkaline earth metal cation (e.g. magnesium, or calcium), or a group $*NR^{114}R^{115}R^{116}R^{117}$, wherein $R^{114}$, $R^{115}$, $R^{116}$ and $R^{117}$ are independently of each other H, a $C_1$-$C_{18}$alkyl group, a $C_2$-$C_{18}$alkyl group substituted with a hydroxy group, or a $C_7$-$C_{18}$aralkyl group and at least two of the substituents $R^{114}$, $R^{115}$, $R^{116}$ and $R^{117}$ are different from H (e.g. dimethylammonium, diethylammonium, triethylammonium, tetrabutylammonium, tributylmethylammonium, trioctylmethylammonium, or dibenzylammonium cation), or two or more of substituents $R^{114}$, $R^{115}$, $R^{116}$ and $R^{117}$ together with the nitrogen atom, to which they are bound, form a heterocycle, such as for example piperidine ring or morpholine ring; or $Cat^{p+}$ is a protonated form of an alkylated guanidine compound, such as 1,1,3,3-tetramethylguanidine and 2-tert-butyl-1,1,3,3-tetramethylguanidine; or a protonated form of an amidine-type base, such as 1,8-diazabicyclo[5.4.0]undec-7-en (DBU) and 1,5-diazabicyclo[4.3.0]non-5-en (DBN); or a protonated form of 1,4-diazabicyclo[2.2.2]octan (DABCO).

$R^{112}$ and $R^{113}$ are preferably independently of each other a $C_2$-$C_{18}$alkyl group, or a $C_7$-$C_{12}$aralkyl group or $R^{112}$ and $R^{113}$ together with the nitrogen atom, to which they are bound, form a 4-8 membered heterocycle ring.

$Cat^{p+}$ is preferably $Na^+$, $K^+$, diethylammonium, diisopropylammonium, dibenzylammonium, triethylammonium, diisopropylethyl ammonium, tri-n-butylammonium, tri-n-octyl ammonium, tetramethylammonium, tetraethylammonium, tetra-n-butylammonium or triethylbenzylammonium.

$C_1$-$C_{18}$alkyl ($C_1$-$C_{18}$alkyl) is typically linear or branched, where possible. Examples are methyl, ethyl, n-propyl, isopropyl, n-butyl, sec.-butyl, isobutyl, tert.-butyl, n-pentyl, 2-pentyl, 3-pentyl, 2,2-dimethylpropyl, 1,1,3,3-tetramethylpentyl, n-hexyl, 1-methylhexyl, 1,1,3,3,5,5-hexamethylhexyl, n-heptyl, isoheptyl, 1,1,3,3-tetramethylbutyl, 1-methylheptyl, 3-methylheptyl, n-octyl, 1,1,3,3-tetramethylbutyl and 2-ethylhexyl, n-nonyl, decyl, undecyl, dodecyl, tridecyl, tetradecyl, pentadecyl, hexadecyl, heptadecyl and octadecyl.

Examples of a $C_3$-$C_{12}$cycloalkyl are cyclopentyl, cyclohexyl, cycloheptyl, or cyclooctyl.

Examples of $C_6$-$C_{12}$aryl are phenyl, 1-naphthyl, 2-naphthyl, 3- or 4-biphenyl, which may be unsubstituted, or substituted by one, or more $C_1$-$C_4$alkyl groups, or $C_1$-$C_4$alkoxy groups.

$C_1$-$C_4$alkyl is typically methyl, ethyl, n-propyl, isopropyl, n-butyl, sec.-butyl, isobutyl, or tert.-butyl.

$C_1$-$C_4$alkoxy is typically methoxy, ethoxy, n-propoxy, isopropoxy, n-butoxy, sec.-butoxy, isobutoxy, or tert.-butoxy.

Examples of $C_7$-$C_{18}$aralkyl are benzyl, 2-benzyl-2-propyl, β-phenylethyl, α,α-dimethylbenzyl, ω-phenyl-butyl, or ω,ω-dimethyl-ω-phenyl-butyl, in which both the aliphatic hydrocarbon group and aromatic hydrocarbon group may be unsubstituted or substituted. Preferred examples are benzyl, 2-phenylethyl and 3-phenylpropyl.

Examples of dithiocarbamate salts are sodium diethyldithiocarbamate, diethylammonium diethyldithiocarbamate, ammonium triethylammonium diethyldithiocarbamate, sodium di-n-butyldithiocarbamate, sodium diisobutyldithiocarbamate, and sodium dibenzyldithiocarbamate, sodium di-n-octyldithiocarbamate, potassium methyl-n-octadecyldithiocarbamate, tributylammonium methyl-n-octadecyldithiocarbamate, dibenzylammonium dibenzyl dithiocarbamate, ethyldiisopropylammonium dibenzyldithiocarbamate, tri-n-butylammonium di-n-butyldithiocarbamate, diisopropylethylammonium methyl-n-octadecyldithiocarbamate, di-n-octylammonium di-n-octyldithiocarbamate and tributylammonium piperidinedithiocarbamate.

In a particularly preferred embodiment the stabilizing agent is selected from compounds of formula (IIb), (IIc), or mixtures thereof.

In a particularly preferred embodiment the silver nanoplatelets comprise one, or more surface stabilizing agents of formula (I) and one, or more surface stabilizing agents of formula (III). In addition, the silver nanoplatelets may comprise one, or more stabilizing agents of formula (IIb).

The most preferred (surface) stabilizing agents (surface stabilizing agents and stabilizing agents), or combinations thereof are shown in the below table.

| | Compound of formula (I) | Compound of formula (III) | Compound of formula (IIb) |
|---|---|---|---|
| SA-1 | A-1 | D-1 | — |
| SA-2 | A-1 | D-1 | B-1 |
| SA-3 | A-1 | D-1 | B-2 |
| SA-4 | A-1 | D-1 | B-3 |
| SA-5 | A-1 | D-1 | B-4 |
| SA-6 | A-1 | D-1 | B-7 |
| SA-7 | A-1 | D-2 | — |
| SA-8 | A-1 | D-2 | B-1 |
| SA-9 | A-1 | D-2 | B-2 |
| SA-10 | A-1 | D-2 | B-3 |
| SA-11 | A-1 | D-2 | B-4 |
| SA-12 | A-1 | D-2 | B-7 |
| SA-13 | A-2 | D-1 | — |
| SA-14 | A-2 | D-1 | B-1 |
| SA-15 | A-2 | D-1 | B-2 |
| SA-16 | A-2 | D-1 | B-3 |
| SA-17 | A-2 | D-1 | B-4 |
| SA-18 | A-2 | D-1 | B-7 |
| SA-19 | A-2 | D-2 | — |
| SA-20 | A-2 | D-2 | B-1 |
| SA-21 | A-2 | D-2 | B-2 |
| SA-22 | A-2 | D-2 | B-3 |
| SA-23 | A-2 | D-2 | B-4 |
| SA-24 | A-2 | D-2 | B-7 |
| SA-25 | A-3 | D-1 | — |
| SA-26 | A-3 | D-1 | B-1 |
| SA-27 | A-3 | D-1 | B-2 |
| SA-28 | A-3 | D-1 | B-3 |
| SA-29 | A-3 | D-1 | B-4 |
| SA-30 | A-3 | D-1 | B-7 |
| SA-31 | A-3 | D-2 | — |
| SA-32 | A-3 | D-2 | B-1 |
| SA-33 | A-3 | D-2 | B-2 |
| SA-34 | A-3 | D-2 | B-3 |
| SA-35 | A-3 | D-2 | B-4 |
| SA-36 | A-3 | D-2 | B-7 |
| SA-37 | A-4 | D-1 | — |
| SA-38 | A-4 | D-1 | B-1 |
| SA-39 | A-4 | D-1 | B-2 |
| SA-40 | A-4 | D-1 | B-3 |
| SA-41 | A-4 | D-1 | B-4 |
| SA-42 | A-4 | D-1 | B-7 |
| SA-43 | A-4 | D-2 | — |
| SA-44 | A-4 | D-2 | B-1 |
| SA-45 | A-4 | D-2 | B-2 |
| SA-46 | A-4 | D-2 | B-3 |
| SA-47 | A-4 | D-2 | B-4 |
| SA-48 | A-4 | D-2 | B-7 |
| SA-49 | A-5 | D-1 | — |
| SA-50 | A-5 | D-1 | B-1 |
| SA-51 | A-5 | D-1 | B-2 |
| SA-52 | A-5 | D-1 | B-3 |
| SA-53 | A-5 | D-1 | B-4 |
| SA-54 | A-5 | D-1 | B-7 |
| SA-55 | A-5 | D-2 | — |
| SA-56 | A-5 | D-2 | B-1 |
| SA-57 | A-5 | D-2 | B-2 |
| SA-58 | A-5 | D-2 | B-3 |
| SA-59 | A-5 | D-2 | B-4 |
| SA-60 | A-5 | D-2 | B-7 |
| SA-61 | A-6 | D-1 | — |
| SA-62 | A-6 | D-1 | B-1 |
| SA-63 | A-6 | D-1 | B-2 |
| SA-64 | A-6 | D-1 | B-3 |
| SA-65 | A-6 | D-1 | B-4 |
| SA-66 | A-6 | D-1 | B-7 |
| SA-67 | A-6 | D-2 | — |
| SA-68 | A-6 | D-2 | B-1 |
| SA-69 | A-6 | D-2 | B-2 |
| SA-70 | A-6 | D-2 | B-3 |
| SA-71 | A-6 | D-2 | B-4 |
| SA-72 | A-6 | D-2 | B-7 |
| SA-73 | A-7 | D-1 | — |
| SA-74 | A-7 | D-1 | B-1 |
| SA-75 | A-7 | D-1 | B-2 |
| SA-76 | A-7 | D-1 | B-3 |
| SA-77 | A-7 | D-1 | B-4 |
| SA-78 | A-7 | D-1 | B-7 |
| SA-79 | A-7 | D-2 | — |
| SA-80 | A-7 | D-2 | B-1 |
| SA-81 | A-7 | D-2 | B-2 |
| SA-82 | A-7 | D-2 | B-3 |
| SA-83 | A-7 | D-2 | B-4 |
| SA-84 | A-7 | D-2 | B-7 |
| SA-85 | A-8 | D-1 | — |
| SA-86 | A-8 | D-1 | B-1 |
| SA-87 | A-8 | D-1 | B-2 |
| SA-88 | A-8 | D-1 | B-3 |
| SA-89 | A-8 | D-1 | B-4 |
| SA-90 | A-8 | D-1 | B-7 |
| SA-91 | A-8 | D-2 | — |
| SA-92 | A-8 | D-2 | B-1 |
| SA-93 | A-8 | D-2 | B-2 |
| SA-94 | A-8 | D-2 | B-3 |
| SA-95 | A-8 | D-2 | B-4 |
| SA-96 | A-8 | D-2 | B-7 |
| SA-97 | A-9 | D-1 | — |
| SA-98 | A-9 | D-1 | B-1 |
| SA-99 | A-9 | D-1 | B-2 |
| SA-100 | A-9 | D-1 | B-3 |
| SA-101 | A-9 | D-1 | B-4 |
| SA-102 | A-9 | D-1 | B-7 |
| SA-103 | A-9 | D-2 | — |
| SA-104 | A-9 | D-2 | B-1 |
| SA-105 | A-9 | D-2 | B-2 |
| SA-106 | A-9 | D-2 | B-3 |
| SA-107 | A-9 | D-2 | B-4 |
| SA-108 | A-9 | D-2 | B-7 |
| SA-109 | A-10 | D-1 | — |
| SA-110 | A-10 | D-1 | B-1 |
| SA-111 | A-10 | D-1 | B-2 |
| SA-112 | A-10 | D-1 | B-3 |
| SA-113 | A-10 | D-1 | B-4 |
| SA-114 | A-10 | D-1 | B-7 |
| SA-115 | A-10 | D-2 | — |
| SA-116 | A-10 | D-2 | B-1 |
| SA-117 | A-10 | D-2 | B-2 |
| SA-118 | A-10 | D-2 | B-3 |
| SA-119 | A-10 | D-2 | B-4 |
| SA-120 | A-10 | D-2 | B-7 |

A process for producing the composition according to the present invention, comprising the silver nanoplatelets, comprises:

(a) preparing a solution (a) comprising a silver precursor, a compound of formula

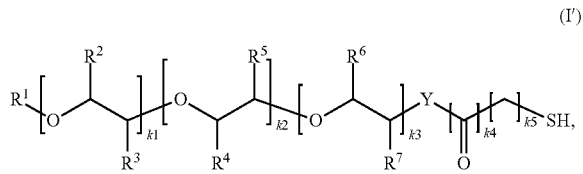

(I')

wherein
R$^1$ is H, C$_1$-C$_{18}$alkyl, phenyl, C$_1$-C$_8$alkylphenyl, or CH$_2$COOH;
R$^2$, R$^3$, R$^4$, R$^5$, R$^6$ and R$^7$ are independently of each other H, C$_1$-C$_8$alkyl, or phenyl;
Y is O, or NR$^8$;
R$^8$ is H, or C$_1$-C$_8$alkyl;
k1 is an integer in the range of from 1 to 500,
k2 and k3 are independently of each other 0, or integers in the range of from 1 to 250;
k4 is 0, or 1,
k5 is an integer in the range of from 1 to 5;
and a polymer, or copolymer which can be obtained by a process comprising the steps
i1) polymerizing in a first step one or more ethylenically unsaturated monomers in the presence of at least one nitroxylether having the structural element

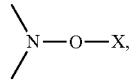

wherein X represents a group having at least one carbon atom and is such that the free radical X• derived from X is capable of initiating polymerization; or
i2) polymerizing in a first step one or more ethylenically unsaturated monomers in the presence of at least one stable free nitroxyl radical

and a free radical initiator;
wherein at least one monomer used in the steps i1) or i2) is a C$_1$-C$_6$ alkyl or hydroxy C$_1$-C$_6$ alkyl ester of acrylic or methacrylic acid; and optionally
ii) a second step, comprising the modification of the polymer or copolymer prepared under i1) or i2) by a transesterification reaction, an amidation, hydrolysis or anhydride modification or a combination thereof;
water, and optionally a defoamer;
(b1) preparing a solution (b), comprising a reducing agent, which comprises at least one boron atom in the molecule, and water;
(b2) adding solution (a) to solution (b), and adding one or more complexing agents;
(c) adding a hydrogen peroxide solution in water; and
(d) optionally adding a stabilization agent to the mixture obtained in step (c), thereby synthesizing the composition, comprising the silver nanoplatelets.

The silver precursor is preferably a silver(I) compound, selected from the group consisting of AgNO$_3$; AgClO$_4$; Ag$_2$SO$_4$; AgCl, AgF, AgOH; Ag$_2$O; AgBF$_4$; AgIO$_3$; AgPF$_6$; R$^{200}$CO$_2$Ag, R$^{200}$SO$_3$Ag, wherein R$^{200}$ is unsubstituted or substituted C$_1$-C$_{18}$alkyl, unsubstituted or substituted C$_5$-C$_8$cycloalkyl, unsubstituted or substituted C$_7$-C$_{18}$aralkyl, unsubstituted or substituted C$_6$-C$_{18}$aryl or unsubstituted or substituted C$_2$-C$_{18}$heteroaryl; Ag salts of dicarboxylic, tricarboxylic, polycarboxylic acids, polysulfonic acids, P-containing acids and mixtures thereof.

More preferably, the silver precursor is selected from the group consisting of silver nitrate, silver acetate, silver perchlorate, silver methanesulfonate, silver benzenesulfonate, silver toluenesulfonate silver trifluoromethanesulfonate, silver sulfate, silver fluoride and mixtures thereof. Silver nitrate is most preferred.

The reducing agent is selected from the group consisting of alkali, or alkaline earth metal borohydrides, such as sodium borohydride, alkali, or alkaline earth metal acyloxyborohydrides, such as sodium triacetoxyborohydride, alkali, or alkaline earth metal alkoxy- or aryloxyborohydrides, such as sodium trimethoxyborohydride, aryloxyboranes, such as catecholborane, and amine-borane complexes, such as diethylaniline borane, tert-butylamine borane, morpholine borane, dimethylamine borane, triethylamine borane, pyridine borane, ammonia borane and mixtures thereof. Sodium borohydride is most preferred.

The one or more complexing agents are selected from the group of chlor-containing compounds, which are capable to liberate chloride ions under reaction conditions, such as metal chlorides, alkyl or aryl ammonium chlorides, phosphonium chlorides; primary or secondary amines and corresponding ammonium salts, such as methyl amine or dimethylamine; ammonia and corresponding ammonium salts; and aminocarboxylic acids and their salts, such as ethylenediaminetetraacetic acid.

Nonlimiting examples of complexing agents include ammonia, methylamine, dimethylamine, ethylamine, ethylenediamine, diethylenetriamine, ethylene-diamine-tetraacetic acid (EDTA); ethylenediamine N,N'-disuccinic acid (EDDS); methyl glycine diacetic acid (MGDA); diethylene triamine penta acetic acid (DTPA); propylene diamine tetracetic acid (PDT A); glutamic acid N,N-diacetic acid (N,N-dicarboxymethyl glutamic acid tetrasodium salt (GLDA); nitrilotriacetic acid (NTA), and any salts thereof; N-hydroxyethylethylenediaminetri-acetic acid (HEDTA), triethylenetetraaminehexaacetic acid (TTHA), N-hydroxyethyliminodiacetic acid (HEIDA), dihydroxyethylglycine (DHEG), ethylenediaminetetrapropionic acid (EDTP) and derivatives thereof, such as, for example, trisodium salt of methylglycinediacetic acid (Na$_3$MGDA) and tetrasodium salt of EDTA.

The defoamer is a compound or composition, capable to suppress foam formation in the reaction mixture, such as, for example, commercially available TEGO® Foamex 1488, 1495, 3062, 7447, 800, 8030, 805, 8050, 810, 815N, 822, 825, 830, 835, 840, 842, 843, 845, 855, 860, 883, K 3, K 7, K 8, N, Antifoam SE-15 from Sigma, Struktol SB-2080 and the like. The amount of the defoamer is in the range of from 0.00001% to 5% by weight based on total weight of reaction mixture prior to hydrogen peroxide addition, preferably from 0.0001% to 3% and more preferably from 0.001% to 2% by weight.

The defoamer can be added to any of the solutions (a) and (b).

Preferably, the reaction of silver nanoplatelets formation is carried out at a total silver concentration of >1% w/w after combining the first solution with the second solution.

Preferably, the reaction of silver nanoplatelets formation is carried out by gradually adding the silver precursor solution into reducing agent solution, whereas the temperature of both solutions is in the range of −3 to 40° C. and the gradual addition is completed within 15 minutes to 24 h time.

The silver nanoplatelets can be isolated by known methods such as decantation, filtration, (ultra)centrifugation, reversible or irreversible agglomeration, phase transfer with organic solvent and combinations thereof. The silver nanoplatelets may be obtained after isolation as a wet paste or dispersion in water. The silver nanoplatelets content in the final preparation of said particles may be up to about 99% by weight, based on the total weight of the preparation, preferably between 5 to 99% by weight, more preferably 5 to 90% by weight.

A preferred aspect of the present invention relates to a method which comprises further a step e), wherein the dispersion of the silver nanoplatelets is concentrated and/or water is replaced at least partially with an organic solvent. Examples of suitable organic solvents are ethanol, isopropanol, ethyl acetate, ethyl-3-ethoxypropionate and 1-methoxy-2-propanol, or mixtures thereof, optionally with water.

In a further embodiment the present invention is directed to coating, or printing ink compositions, comprising the composition according to the present invention, comprising the silver nanoplatelets.

The coating, or printing ink composition comprises
(i) the composition according to the present invention, comprising the silver nanoplatelets,
(ii) a binder, and
(iii) optionally a solvent.

The weight ratio of silver nanoplatelets to binder is in the range from 20:1 to 1:2 in case the binder is a polymeric binder, or is in the range from 5:1 to 1:15 in case the binder is an UV curable binder (UV curable composition).

In case of a polymeric binder the coating, or printing ink composition normally comprises:
(i) the composition according to the present invention, comprising the silver nanoplatelets in an amount of 0.5 to 40% by weight, preferably 1 to 30% by weight,
(ii) a polymeric binder in an amount of from 0.05 to 40% by weight, preferably 0.1 to 30% by weight, and
(iii) a solvent in an amount of 10 to 99% by weight, preferably 20 to 99% by weight, wherein the amounts of components (i), (ii) and (iii) are based on the total weight of the components (i), (ii) and (iii).

The solvent is preferably selected from alcohols (such as ethanol, 1-propanol, 2-propanol, 1-butanol, 2-butanol, isobutanol, tert-butanol, tert-pentanol), cyclic or acyclic ethers (such as diethyl ether, tetrahydrofuran and 2-methyltetrahydrofurane), ketones (such as acetone, 2-butanone, 3-pentanone), ether-alcohols (such as 2-methoxyethanol, 1-methoxy-2-propanol, ethylene glycol monobutyl ether, diethylene glycol monoethyl ether, diethylene glycol monopropyl ether, and diethylene glycol monobutyl ether), esters (such as ethyl acetate, ethyl propionate, and ethyl 3-ethoxypropionate), polar aprotic solvents (such as acetonitrile, dimethyl formamide, and dimethyl sulfoxide), mixtures thereof and mixtures with water. The preferred solvents include $C_2$-$C_6$alcohols, esters, ketones, ethers, ether-alcohols, mixtures thereof and mixtures with water.

The binder can be of organic or hybrid nature. Hybrid materials contain inorganic and organic components.

Preferably, the binder is a high-molecular-weight organic compound (polymeric binder) conventionally used in coating compositions. High molecular weight organic materials usually have molecular weights of about from 103 to $10^8$ g/mol or even more. They may be, for example, natural resins, drying oils, rubber or casein, or natural substances derived therefrom, such as chlorinated rubber, oil-modified alkyd resins, viscose, cellulose ethers or esters, such as ethylcellulose, cellulose acetate, cellulose propionate, cellulose acetobutyrate or nitrocellulose, but especially totally synthetic organic polymers (thermosetting plastics and thermoplastics), as are obtained by polymerisation, polycondensation or polyaddition. From the class of the polymerisation resins there may be mentioned, especially, polyolefins, such as polyethylene, polypropylene or polyisobutylene, and also substituted polyolefins, such as polymerisation products of vinyl chloride, vinyl acetate, styrene, acrylonitrile, acrylic acid esters, methacrylic acid esters or butadiene, and also copolymerisation products of the said monomers, such as especially ABS or EVA.

With respect to the polymeric binder, a thermoplastic resin may be used, examples of which include, polyethylene based polymers [polyethylene (PE), ethylene-vinyl acetate copolymer (EVA), vinyl chloride-vinyl acetate copolymer, vinyl alcohol-vinyl acetate copolymer, polypropylene (PP), vinyl based polymers [poly(vinyl chloride) (PVC), poly (vinyl butyral) (PVB), poly(vinyl alcohol) (PVA), poly (vinylidene chloride) (PVdC), poly(vinyl acetate) (PVAc), poly(vinyl formal) (PVF)], polystyrene based polymers [polystyrene (PS), styrene-acrylonitrile copolymer (AS), acrylonitrile-butadiene-styrene copolymer (ABS)], acrylic based polymers [poly(methyl methacrylate) (PMMA), MMA-styrene copolymer], polycarbonate (PC), celluloses [ethyl cellulose (EC), cellulose acetate (CA), propyl cellulose (CP), cellulose acetate butyrate (CAB), cellulose nitrate (CN), also known as nitrocellulose], fluorin based polymers [polychlorofluoroethylene (PCTFE), polytetrafluoroethylene (PTFE), tetrafluoroethylene-hexafluoroethylene copolymer (FEP), poly(vinylidene fluoride) (PVdF)], urethane based polymers (PU), nylons [type 6, type 66, type 610, type 11], polyesters (alkyl) [polyethylene terephthalate (PET), polybutylene terephthalate (PBT), polycyclohexane terephthalate (PCT)], novolac type phenolic resins, or the like. In addition, thermosetting resins such as resol type phenolic resin, a urea resin, a melamine resin, a polyurethane resin, an epoxy resin, an unsaturated polyester and the like, and natural resins such as protein, gum, shellac, copal, starch and rosin may also be used.

The polymeric binder preferably comprises nitrocellulose, ethyl cellulose, cellulose acetate, cellulose acetate propionate (CAP), cellulose acetate butyrate (CAB), hydroxyethyl cellulose (HEC), hydroxypropyl cellulose (HPC), alcohol soluble propionate (ASP), vinyl chloride, vinyl acetate copolymers, vinyl acetate, vinyl, acrylic, polyurethane, polyamide, rosin ester, hydrocarbon, aldehyde, ketone, urethane, polythyleneterephthalate, terpene phenol, polyolefin, silicone, cellulose, polyamide, polyester, rosin ester resins, shellac and mixtures thereof, most preferred are soluble cellulose derivatives such as hydroxylethyl cellulose, hydroxypropyl cellulose, nitrocellulose, carboxymethylcellulose as well as chitosan and agarose, in particular hydroxyethyl cellulose and hydroxypropyl cellulose.

Most preferred, the polymeric binder is selected from the group consisting of nitro cellulose, vinyl chloride, vinyl acetate copolymers, vinyl, acrylic, urethane, polythyleneterephthalate, terpene phenol, polyolefin, silicone, cellulose, polyamide, polyester and rosin ester resins or mixtures thereof.

In case of an UV curable binder the composition the coating, or printing ink composition normally comprises:
(i) the silver nanoplatelets, in an amount of 0.5 to 40% by weight, preferably 1 to 30% by weight,
(ii) an UV curable binder in an amount of from 0.1 to 90% by weight, preferably 0.2 to 80% by weight, and
(iii) optionally a solvent in an amount of 0 to 99% by weight, preferably 5 to 95% by weight,
(iv) a photoinitiator in an amount of 0.1 to 10% by weight, preferably 0.5 to 5.0% by weight, wherein the amounts of components (i), (ii), (iii) and (iv) are based on the total weight of the components (i), (ii), (iii) and (iv).

The UV curable composition is preferably deposited by means of gravure, flexographic, ink jet, offset, or screen printing process.

The UV curable composition comprises photoinitiator(s) and unsaturated compound(s) including one or more olefinic double bonds (binder).

Examples of photoinitiators are known to the person skilled in the art and for example published by Kurt Dietliker in "A compilation of photoinitiators commercially available for UV today", Sita Technology Textbook, Edinburgh, London, 2002.

Examples of suitable acylphosphine oxide compounds are of the formula XII

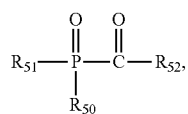

$R_{50}$ is unsubstituted cyclohexyl, cyclopentyl, phenyl, naphthyl or biphenylyl; or is cyclohexyl, cyclopentyl, phenyl, naphthyl or biphenylyl substituted by one or more halogen, $C_1$-$C_{12}$alkyl, $C_1$-$C_{12}$alkoxy, $C_1$-$C_{12}$alkylthio or by $NR_{53}R_{54}$;
or $R_{50}$ is unsubstituted $C_1$-$C_{20}$alkyl or is $C_1$-$C_{20}$alkyl which is substituted by one or more halogen, $C_1$-$C_{12}$alkoxy, $C_1$-$C_{12}$alkylthio, $NR_{53}R_{54}$ or by —(CO)—O—$C_1$-$C_{24}$alkyl;
$R_{51}$ is unsubstituted cyclohexyl, cyclopentyl, phenyl, naphthyl or biphenylyl; or is cyclohexyl, cyclopentyl, phenyl, naphthyl or biphenylyl substituted by one or more halogen, $C_1$-$C_{12}$alkyl, $C_1$-$C_{12}$alkoxy, $C_1$-$C_{12}$alkylthio or by $NR_{53}R_{54}$; or $R_{51}$ is —(CO)R'$_{52}$; or $R_{51}$ is $C_1$-$C_{12}$alkyl which is unsubstituted or substituted by one or more halogen, $C_1$-$C_{12}$alkoxy, $C_1$-$C_{12}$alkylthio, or by $NR_{53}R_{54}$;
$R_{52}$ and R'$_{52}$ independently of each other are unsubstituted cyclohexyl, cyclopentyl, phenyl, naphthyl or biphenylyl, or are cyclohexyl, cyclopentyl, phenyl, naphthyl or biphenylyl substituted by one or more halogen, $C_1$-$C_4$alkyl or $C_1$-$C_4$alkoxy; or $R_{52}$ is a 5- or 6-membered heterocyclic ring comprising an S atom or N atom;
$R_{53}$ and $R_{54}$ independently of one another are hydrogen, unsubstituted $C_1$-$C_{12}$alkyl or $C_1$-$C_{12}$alkyl substituted by one or more OH or SH wherein the alkyl chain optionally is interrupted by one to four oxygen atoms; or $R_{53}$ and $R_{54}$ independently of one another are $C_2$-$C_{12}$-alkenyl, cyclopentyl, cyclohexyl, benzyl or phenyl;

Specific examples are bis(2,4,6-trimethylbenzoyl)-phenylphosphine oxide; 2,4,6-trimethylbenzoyl-diphenyl-phosphine oxide; ethyl (2,4,6 trimethylbenzoyl phenyl) phosphinic acid ester; (2,4,6-trimethylbenzoyl)-2,4-dipentoxyphenylphosphine oxide, bis(2,6-dimethoxybenzoyl)-2,4,4-trimethylpentylphosphine oxide.

Interesting further are mixtures of the compounds of the formula XII with compounds of the formula XI as well as mixtures of different compounds of the formula XII.

Examples are mixtures of bis(2,6-dimethoxybenzoyl)-2,4,4-trimethylpentylphosphine oxide with 1-hydroxy-cyclohexyl-phenyl-ketone, of bis(2,4,6-trimethylbenzoyl)-phenylphosphine oxide with 2-hydroxy-2-methyl-1-phenyl-propan-1-one, of bis(2,4,6-trimethylbenzoyl)-phenylphosphine oxide with ethyl (2,4,6 trimethylbenzoyl phenyl) phosphinic acid ester, etc. Examples of suitable benzophenone compounds are compounds of the formula X:

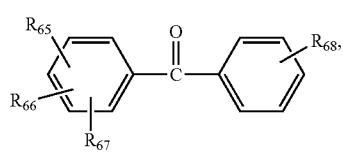

wherein
$R_{65}$, $R_{66}$ and $R_{67}$ independently of one another are hydrogen, $C_1$-$C_4$alkyl, $C_1$-$C_4$-halogenalkyl, $C_1$-$C_4$alkoxy, Cl or $N(C_1$-$C_4$alkyl)$_2$;
$R_{68}$ is hydrogen, $C_1$-$C_4$alkyl, $C_1$-$C_4$halogenalkyl, phenyl, $N(C_1$-$C_4$alkyl)$_2$, COOCH$_3$,

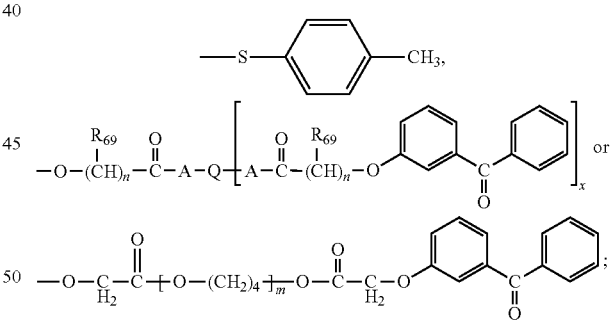

Q is a residue of a polyhydroxy compound having 2 to 6 hydroxy groups;
x is a number greater than 1 but no greater than the number of available hydroxyl groups in Q;
A is —[O(CH$_2$)$_b$CO]$_y$— or —[O(CH$_2$)$_b$CO]$_{(y-1)}$—[O(CHR$_{71}$CHR$_{70}$)$_a$]$_y$—;
$R_{69}$ is hydrogen, methyl or ethyl; and if N is greater than 1 the radicals $R_{69}$ may be the same as or different from each other;
a is a number from 1 to 2;
b is a number from 4 to 5;
y is a number from 1 to 10;
n is; and
m is an integer 2-10.

Specific examples are benzophenone, a mixture of 2,4,6-trimethylbenzophenone and 4-methylbenzophenone, 4-phenylbenzophenone, 4-methoxybenzophenone, 4,4'-dimethoxybenzophenone, 4,4'-dimethylbenzophenone, 4,4'-dichlorobenzophenone, 4,4'-dimethylaminobenzophenone, 4,4'-diethylaminobenzophenone, 4-methylbenzophenone, 2,4,6-trimethylbenzophenone, 4-(4-methylthiophenyl)benzophenone, 3,3'-dimethyl-4-methoxybenzophenone, methyl-2-benzoylbenzoate, 4-(2-hydroxyethylthio)benzophenone, 4-(4-tolylthio)benzophenone, 4-benzoyl-N,N,N-trimethylbenzenemethanaminium chloride, 2-hydroxy-3-(4-benzoylphenoxy)-N,N,N-trimethyl-1-propanaminium chloride monohydrate, 4-(13-acryloyl-1,4,7,10,13-pentaoxatridecyl)benzophenone, 4-benzoyl-N,N-dimethyl-N-[2-(1-oxo-2-propenyl)oxy]ethylbenzenemethanaminium chloride; [4-(2-hydroxy-ethylsulfanyl)-phenyl]-(4-isopropylphenyl)-methanone; biphenyl-[4-(2-hydroxy-ethylsulfanyl)-phenyl]-methanone; biphenyl-4-yl-phenyl-methanone; biphenyl-4-yl-p-tolyl-methanone; biphenyl-4-yl-m-tolyl-methanone; [4-(2-hydroxy-ethylsulfanyl)-phenyl]-p-tolyl-methanone; [4-(2-hydroxy-ethylsulfanyl)-phenyl]-(4-isopropyl-phenyl)-methanone; [4-(2-hydroxy-ethylsulfanyl)-phenyl]-(4-methoxy-phenyl)-methanone; 1-(4-benzoyl-phenoxy)-propan-2-one; [4-(2-hydroxy-ethylsulfanyl)-phenyl]-(4-phenoxy-phenyl)-methanone; 3-(4-benzoyl-phenyl)-2-dimethylamino-2-methyl-1-phenyl-propan-1-one; (4-chloro-phenyl)-(4-octylsulfanyl-phenyl)-methanone; (4-chloro-phenyl)-(4-dodecylsulfanyl-phenyl)-methanone; (4-bromo-phenyl)-(4-octylsulfanyl-phenyl)-methanone; (4-dodecylsulfanyl-phenyl)-(4-methoxy-phenyl)-methanone; (4-benzoyl-phenoxy)-acetic acid methyl ester; biphenyl-[4-(2-hydroxy-ethylsulfanyl)-phenyl]-methanone; 1-[4-(4-benzoylphenylsulfanyl)phenyl]-2-methyl-2-(4-methylphenylsulfonyl)propan-1-one.

Examples of suitable alpha-hydroxy ketone, alpha-alkoxyketone or alpha-aminoketone compounds are of the formula (XI)

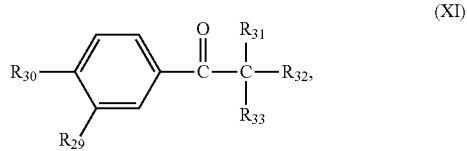

(XI)

$R_{29}$ is hydrogen or $C_1$-$C_{18}$alkoxy;

$R_{30}$ is hydrogen, $C_1$-$C_{18}$alkyl, $C_1$-$C_{12}$hydroxyalkyl, $C_1$-$C_{18}$alkoxy, OCH$_2$CH$_2$—OR$_{34}$, morpholino, S—$C_1$-$C_{18}$alkyl, a group —HC=CH$_2$, —C(CH$_3$)=CH$_2$,

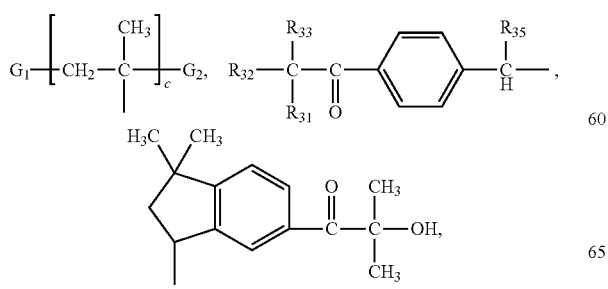

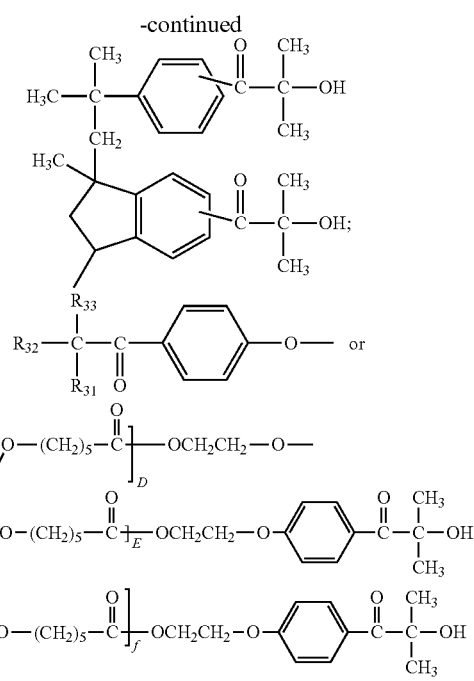

d, e and f are 1-3;
c is 2-10;
$G_1$ and $G_2$ independently of one another are end groups of the polymeric structure, preferably hydrogen or methyl;
$R_{34}$ is hydrogen,

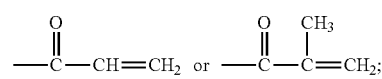

$R_{31}$ is hydroxy, $C_1$-$C_{16}$alkoxy, morpholino, dimethylamino or —O(CH$_2$CH$_2$O)$_9$—$C_1$-$C_{16}$alkyl;
g is 1-20;
$R_{32}$ and $R_{33}$ independently of one another are hydrogen, $C_1$-$C_6$alkyl, $C_1$-$C_{16}$alkoxy or —O(CH$_2$CH$_2$O)$_9$—$C_1$-$C_{16}$alkyl; or are unsubstituted phenyl or benzyl; or phenyl or benzyl substituted by $C_1$-$C_{12}$-alkyl; or $R_{32}$ and $R_{33}$ together with the carbon atom to which they are attached form a cyclohexyl ring;
$R_{35}$ is hydrogen, OR$_{36}$ or NR$_{37}$R$_{38}$;
$R_{36}$ is hydrogen, $C_1$-$C_{12}$alkyl which optionally is interrupted by one or more non-consecutive O-atoms and which uninterrupted or interrupted $C_1$-$C_{12}$alkyl optionally is substituted by one or more H,
or $R_{36}$ is

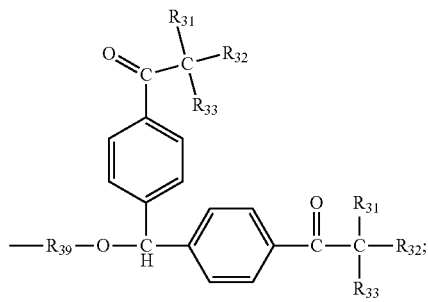

$R_{37}$ and $R_{38}$ independently of each other are hydrogen or $C_1$-$C_{12}$alkyl which is unsubstituted or is substituted by one or more OH;

$R_{39}$ is $C_1$-$C_{12}$alkylene which optionally is interrupted by one or more non-consecutive O, —(CO)—NH—$C_1$-$C_{12}$alkylene-NH—(CO)— or

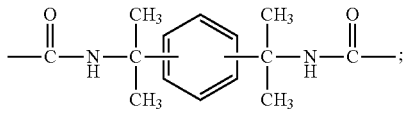

with the proviso that $R_{31}$, $R_{32}$ and $R_{33}$ not all together are $C_1$-$C_{16}$alkoxy or —O(CH$_2$CH$_2$O)$_9$—$C_1$-$C_{16}$alkyl.

Specific examples are 1-hydroxy-cyclohexyl-phenyl-ketone (optionally in admixture with benzophenone), 2-methyl-1[4-(methylthio)phenyl]-2-morpholinopropan-1-one, 2-benzyl-2-dimethylamino-1-(4-morpholinophenyl)-butan-1-one, 2-dimethylamino-2-(4-methyl-benzyl)-1-(4-morpholin-4-yl-phenyl)-butan-1-one, (3,4-dimethoxy-benzoyl)-1-benzyl-1-dimethylamino propane, 1-[4-(2-hydroxyethoxy)-phenyl]-2-hydroxy-2-methyl-1-propan-1-one, 2,2-dimethoxy-1,2-diphenylethan-1-one, 2-hydroxy-2-methyl-1-phenyl-propan-1-one, 2-hydroxy-1-{4-[4-(2-hydroxy-2-methyl-propionyl)-benzyl]-phenyl}-2-methyl-propan-1-one, 2-hydroxy-1-{4-[4-(2-hydroxy-2-methyl-propionyl)-phenoxy]-phenyl}-2-methyl-propan-1-one, 2-hydroxy-1-{1-[4-(2-hydroxy-2-methyl-propionyl)-phenyl]-1,3,3-trimethyl-indan-5-yl}-2-methyl-propan-1-one.

Examples of suitable phenylglyoxylate compounds are of the formula XIII

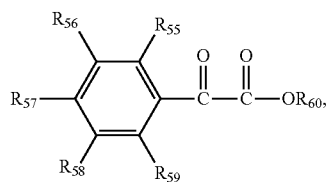

(XIII)

wherein $R_{60}$ is hydrogen, $C_1$-$C_{12}$alkyl or

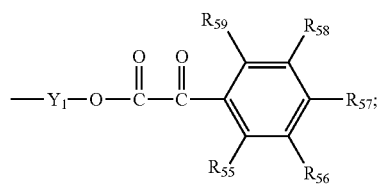

$R_{55}$, $R_{56}$, $R_{57}$, $R_{58}$ and $R_{59}$ independently of one another are hydrogen, unsubstituted $C_1$-$C_{12}$alkyl or $C_1$-$C_{12}$alkyl substituted by one or more OH, $C_1$-$C_4$alkoxy, phenyl, naphthyl, halogen or by CN; wherein the alkyl chain optionally is interrupted by one or more oxygen atoms; or $R_{55}$, $R_{56}$, $R_{57}$, $R_{58}$ and $R_{59}$ independently of one another are $C_1$-$C_4$alkoxy, $C_1$-$C_4$alkythio or NR$_{52}$R$_{53}$;

$R_{52}$ and $R_{53}$ independently of one another are hydrogen, unsubstituted $C_1$-$C_{12}$alkyl or $C_1$-$C_{12}$alkyl substituted by one or more OH or SH wherein the alkyl chain optionally is interrupted by one to four oxygen atoms; or $R_{52}$ and $R_{53}$ independently of one another are $C_2$-$C_{12}$-alkenyl, cyclopentyl, cyclohexyl, benzyl or phenyl; and $Y_1$ is $C_1$-$C_{12}$alkylene optionally interrupted by one or more oxygen atoms.

Specific examples of the compounds of the formula XIII are oxo-phenyl-acetic acid 2-[2-(2-oxo-2-phenyl-acetoxy)-ethoxy]-ethyl ester, methyl α-oxo benzeneacetate. Examples of suitable oxime ester compounds are of the formula XIV

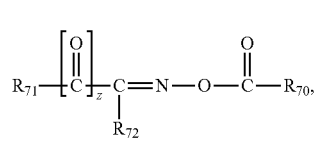

(XIV)

wherein z is 0 or 1;

$R_{70}$ is hydrogen, $C_3$-$C_8$cycloalkyl; $C_1$-$C_{12}$alkyl which is unsubstituted or substituted by one or more halogen, phenyl or by CN; or $R_{70}$ is $C_2$-$C_5$alkenyl; phenyl which is unsubstituted or substituted by one or more $C_1$-$C_6$alkyl, halogen, CN, OR$_{73}$, SR$_{74}$ or by NR$_{75}$R$_{76}$; or $R_{70}$ is $C_1$-$C_8$alkoxy, benzyloxy; or phenoxy which is unsubstituted or substituted by one or more $C_1$-$C_8$alkyl or by halogen;

$R_{71}$ is phenyl, naphthyl, benzoyl or naphthoyl, each of which is substituted by one or more halogen, $C_1$-$C_{12}$alkyl, $C_3$-$C_8$cycloalkyl, benzyl, phenoxycarbonyl, $C_2$-$C_{12}$alkoxycarbonyl, OR$_{73}$, SR$_{74}$, SOR$_{74}$, SO$_2$R$_{74}$ or by NR$_{75}$R$_{76}$, wherein the substituents OR$_{73}$, SR$_{74}$ and NR$_{75}$R$_{76}$ optionally form 5- or 6-membered rings via the radicals $R_{73}$, $R_{74}$, $R_{75}$ and/or $R_{76}$ with further substituents on the phenyl or naphthyl ring; or each of which is substituted by phenyl or by phenyl which is substituted by one or more OR$_{73}$, SR$_{74}$ or by NR$_{75}$R$_{66}$;

or $R_{71}$ is thioxanthyl, or

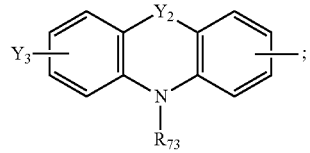

$R_{72}$ is hydrogen; unsubstituted $C_1$-$C_{20}$alkyl or $C_1$-$C_{20}$alkyl which is substituted by one or more halogen, OR$_{73}$, SR$_{74}$, $C_3$-$C_8$cycloalkyl or by phenyl; or is $C_3$-$C_8$cycloalkyl; or is phenyl which is unsubstituted or substituted by one or more $C_1$-$C_6$alkyl, phenyl, halogen, OR$_{73}$, SR$_{74}$ or by NR$_{75}$R$_{76}$; or is $C_2$-$C_{20}$alkanoyl or benzoyl which is unsubstituted or substituted by one or more $C_1$-$C_6$alkyl, phenyl, OR$_{73}$, SR$_{74}$ or by NR$_{75}$R$_{76}$; or is $C_2$-$C_{12}$alkoxycarbonyl, phenoxycarbonyl, CN, CONR$_{75}$R$_{76}$, NO$_2$, $C_1$-$C_4$haloalkyl, S(O)$_y$—$C_1$-$C_6$alkyl, or S(O)$_y$-phenyl, y is 1 or 2;

$Y_2$ is a direct bond or no bond;

$Y_3$ is NO$_2$ or

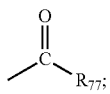

$R_{73}$ and $R_{74}$ independently of one another are hydrogen, $C_1$-$C_{20}$alkyl, $C_2$-$C_{12}$alkenyl, $C_3$-$C_8$cycloalkyl, $C_3$-$C_8$cycloalkyl which is interrupted by one or more, preferably 2, O, phenyl-$C_1$-$C_3$alkyl; or are $C_1$-$C_8$alkyl which is substituted by OH, SH, CN, $C_1$-$C_8$alkoxy, $C_1$-$C_8$alkanoyl, $C_3$-$C_8$cycloalkyl, by $C_3$-$C_8$cycloalkyl which is interrupted by one or more O, or which $C_1$-$C_8$alkyl is substituted by benzoyl which is unsubstituted or substituted by one or more $C_1$-$C_6$alkyl, halogen, OH, $C_1$-$C_4$alkoxy or by $C_1$-$C_4$alkylsulfanyl; or are phenyl or naphthyl, each of which is unsubstituted or substituted by halogen, $C_1$-$C_{12}$alkyl, $C_1$-$C_{12}$alkoxy, phenyl-$C_1$-$C_3$alkyloxy, phenoxy, $C_1$-$C_{12}$alkylsulfanyl, phenylsulfanyl, N($C_1$-$C_{12}$alkyl)$_2$, diphenylamino or by

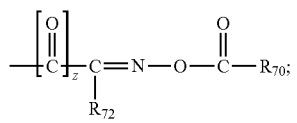

$R_{75}$ and $R_{76}$ independently of each other are hydrogen, $C_1$-$C_{20}$alkyl, $C_2$-$C_4$hydroxyalkyl, $C_2$-$C_{10}$alkoxyalkyl, $C_2$-$C_6$alkenyl, $C_3$-$C_8$cycloalkyl, phenyl-$C_1$-$C_3$alkyl, $C_1$-$C_8$alkanoyl, $C_3$-$C_{12}$alkenoyl, benzoyl; or are phenyl or naphthyl, each of which is unsubstituted or substituted by $C_1$-$C_{12}$alkyl, benzoyl or by $C_1$-$C_{12}$alkoxy; or $R_{75}$ and $R_{76}$ together are $C_2$-$C_6$alkylene optionally interrupted by O or NR$_{73}$ and optionally are substituted by hydroxyl, $C_1$-$C_4$alkoxy, $C_2$-$C_4$alkanoyloxy or by benzoyloxy;

$R_{77}$ is $C_1$-$C_{12}$alkyl, thienyl or phenyl which is unsubstituted or substituted by $C_1$-$C_{12}$alkyl, OR$_{73}$, morpholino or by N-carbazolyl.

Specific examples are 1,2-octanedione 1-[4-(phenylthio) phenyl]-2-(O-benzoyloxime), ethanone 1-[9-ethyl-6-(2-methylbenzoyl)-9H-carbazol-3-yl]-1-(O-acetyloxime), 9H-thioxanthene-2-carboxaldehyde 9-oxo-2-(O-acetyloxime), ethanone 1-[9-ethyl-6-(4morpholinobenzoyl)-9H-carbazol-3-yl]-1-(O-acetyloxime), ethanone 1-[9-ethyl-6-(2-methyl-4-(2-(1,3-dioxo-2-dimethyl-cyclopent-5-yl)ethoxy)-benzoyl)-9H-carbazol-3-yl]-1-(O-acetyloxime) (Adeka N-1919), ethanone 1-[9-ethyl-6-nitro-9H-carbazol-3-yl]-1-[2-methyl-4-(1-methyl-2-methoxy)ethoxy)phenyl]-1-(O-acetyloxime) (Adeka NC1831), etc.

It is also possible to add cationic photoinitiators, such as benzoyl peroxide (other suitable peroxides are described in U.S. Pat. No. 4,950,581, column 19, lines 17-25), or aromatic sulfonium, phosphonium or iodonium salts, such as are described, for example, in U.S. Pat. No. 4,950,581, column 18, line 60 to column 19, line 10.

Suitable sulfonium salt compounds are of formula XVa, XVb, XVc, XVd or XVe

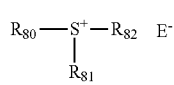 XVa

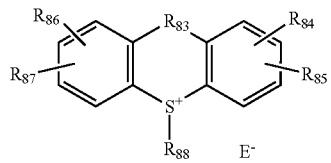 XVb

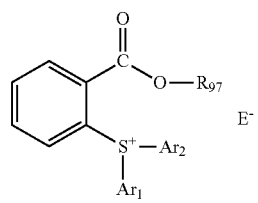 XVc

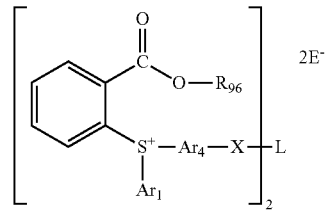 XVd

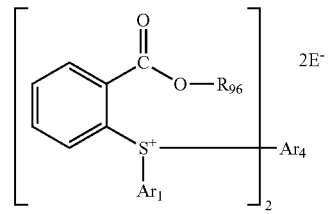 XVe wherein
$R_{80}$, $R_{81}$ and $R_{82}$ are each independently of the others unsubstituted phenyl, or phenyl substituted by —S-phenyl,

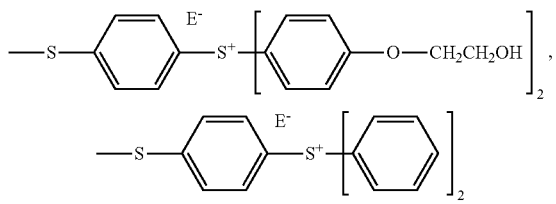

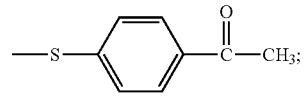

$R_{83}$ is a direct bond, S, O, $CH_2$, $(CH_2)_2$, CO or NR$_{89}$;
$R_{84}$, $R_{85}$, $R_{86}$ and $R_{87}$ independently of one another are hydrogen, $C_1$-$C_{20}$alkyl, $C_3$-$C_8$cycloalkyl, $C_1$-$C_{20}$alkoxy, $C_2$-$C_{20}$alkenyl, CN, OH, halogen, $C_1$-$C_6$alkylthio, phenyl, naphthyl, phenyl-$C_1$-$C_7$alkyl, naphthyl-$C_1$-$C_3$alkyl, phenoxy, naphthyloxy, phenyl-$C_1$-$C_7$alkyloxy, naphthyl-$C_1$-$C_3$alkyloxy, phenyl-$C_2$-$C_6$alkenyl, naphthyl-$C_2$-$C_4$alkenyl, S-phenyl, (CO)R$_{89}$, O(CO)R$_{89}$, (CO)OR$_{89}$, $SO_2R_{89}$ or $OSO_2R_{89}$;
$R_{88}$ is $C_1$-$C_{20}$alkyl, $C_1$-$C_{20}$hydroxyalkyl,

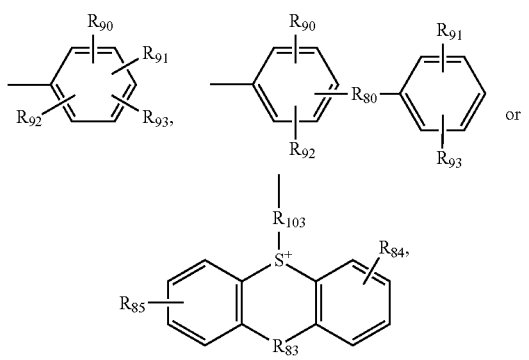

$R_{89}$ is hydrogen, $C_1$-$C_{12}$alkyl, $C_1$-$C_{12}$hydroxyalkyl, phenyl, naphthyl or biphenylyl;

$R_{90}$, $R_{91}$, $R_{92}$ and $R_{93}$ independently of one another have one of the meanings as given for $R_{84}$; or $R_{90}$ and $R_{91}$ are joined to form a fused ring system with the benzene rings to which they are attached;

$R_{95}$ is a direct bond, S, O or $CH_2$;

$R_{96}$ is hydrogen, $C_1$-$C_{20}$alkyl; $C_2$-$C_{20}$alkyl interrupted by one or more O; or is -L-M-$R_{98}$ or -L-$R_{98}$;

$R_{97}$ has one of the meanings as given for $R_{96}$ or is

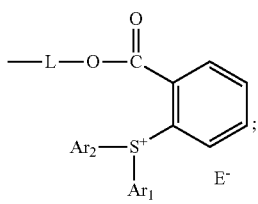

$R_{98}$ is a monovalent sensitizer or photoinitiator moiety;

$Ar_1$ and $Ar_2$ independently of one another are phenyl unsubstituted or substituted by $C_1$-$C_{20}$alkyl, halogen or $OR_{99}$;

or are unsubstituted naphthyl, anthryl, phenanthryl or biphenylyl;

or are naphthyl, anthryl, phenanthryl or biphenylyl substituted by $C_1$-$C_{20}$alkyl, OH or $OR_{99}$;

or are —$Ar_4$-$A_1$-$Ar_3$ or

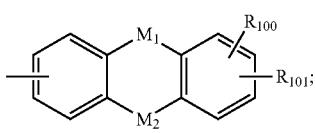

$Ar_3$ is unsubstituted phenyl, naphthyl, anthryl, phenanthryl or biphenylyl;

or is phenyl, naphthyl, anthryl, phenanthryl or biphenylyl substituted by $C_1$-$C_{20}$alkyl, $OR_{99}$ or benzoyl;

$Ar_4$ is phenylene, naphthylene, anthrylene or phenanthrylene;

$A_1$ is a direct bond, S, O or $C_1$-$C_{20}$alkylene;

X is CO, C(O)O, OC(O), O, S or $NR_{99}$;

L is a direct bond, S, O, $C_1$-$C_{20}$alkylene or $C_2$-$C_{20}$alkylene interrupted by one or more non-consecutive O;

$R_{99}$ is $C_1$-$C_{20}$alkyl or $C_1$-$C_{20}$hydroxyalkyl; or is $C_1$-$C_{20}$alkyl substituted by $O(CO)R_{102}$;

$M_1$ is S, CO or $NR_{100}$;

$M_2$ is a direct bond, $CH_2$, O or S;

$R_{100}$ and $R_{101}$ independently of one another are hydrogen, halogen, $C_1$-$C_8$alkyl, $C_1$-$C_8$alkoxy or phenyl;

$R_{102}$ is $C_1$-$C_{20}$alkyl;

$R_{103}$ is

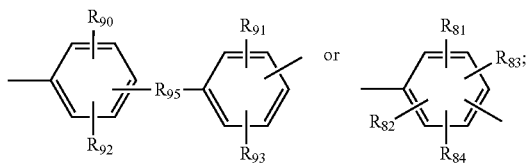

and

E is an anion, especially $PF_6$, $SbF_6$, $AsF_6$, $BF_4$, $(C_6F_5)_4B$, Cl, Br, $HSO_4$, $CF_3$—$SO_3$, F—$SO_3$,

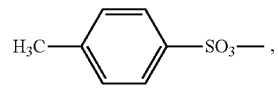

$CH_3$—$SO_3$, $ClO_4$, $PO_4$, $NO_3$, $SO_4$, $CH_3$—$SO_4$, or

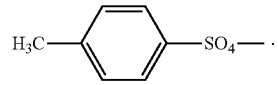

Specific examples of sulfonium salt compounds are for example Irgacure®270 (BASF SE); Cyracure® UVI-6990, Cyracure®UVI-6974 (DOW), Degacure®KI 85 (Degussa), SP-55, SP-150, SP-170 (Asahi Denka), GE UVE 1014 (General Electric), SarCat®KI-85 (=triarylsulfonium hexafluorophosphate; Sartomer), SarCat® CD 1010 (=mixed triarylsulfonium hexafluoroantimonate; Sartomer); SarCat® CD 1011 (=mixed triarylsulfonium hexafluorophosphate; Sartomer).

Suitable iodonium salt compounds are of formula XVI

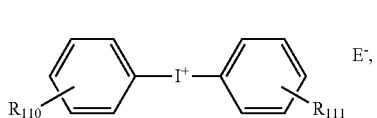

(XVI)

$R_{110}$ and $R_{111}$ are each independently of the other hydrogen, $C_1$-$C_{20}$alkyl, $C_1$-$C_{20}$alkoxy, OH-substituted $C_1$-$C_{20}$alkoxy, halogen, $C_2$-$C_{12}$alkenyl, $C_3$-$C_8$cycloalkyl, especially methyl, isopropyl or isobutyl; and E is an anion, especially $PF_6$, $SbF_6$, $AsF_6$, $BF_4$, $(C_6F_5)_4B$, Cl, Br, $HSO_4$, $CF_3$—$SO_3$, F—$SO_3$,

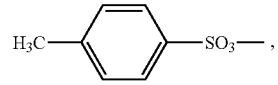

CH$_3$—SO$_3$, ClO$_4$, PO$_4$, NO$_3$, SO$_4$, CH$_3$—SO$_4$ or

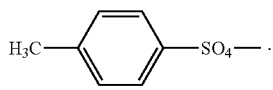

Specific examples of iodonium salt compounds are e.g. tolylcumyliodonium tetrakis(pentafluorophenyl)borate, 4-[(2-hydroxy-tetradecyloxy)phenyl]phenyliodonium hexafluoroantimonate or hexafluorophosphate, tolylcumyliodonium hexafluorophosphate, 4-isopropylphenyl-4'-methylphenyliodonium hexafluorophosphate, 4-isobutylphenyl-4'-methylphenyliodonium hexafluorophosphate, 4-octyloxyphenyl-phenyliodonium hexafluorophosphate or hexafluoroantimonate, bis(dodecylphenyl)iodonium hexafluoroantimonate or hexafluorophosphate, bis(4-methylphenyl)iodonium hexafluorophosphate, bis(4-methoxyphenyl)iodonium hexafluorophosphate, 4-methylphenyl-4'-ethoxyphenyliodonium hexafluorophosphate, 4-methylphenyl-4'-dodecylphenyliodonium hexafluorophosphate, 4-methylphenyl-4'-phenoxyphenyliodonium hexafluorophosphate.

Of all the iodonium salts mentioned, compounds with other anions are, of course, also suitable. The preparation of iodonium salts is known to the person skilled in the art and described in the literature, for example U.S. Pat. Nos. 4,151,175, 3,862,333, 4,694,029, EP 562897, U.S. Pat. Nos. 4,399,071, 6,306,555, WO 98/46647 J. V. Crivello, "Photoinitiated Cationic Polymerization" in: UV Curing: Science and Technology, Editor S. P. Pappas, pages 24-77, Technology Marketing Corporation, Norwalk, Conn. 1980, ISBN No. 0-686-23773-0; J. V. Crivello, J. H. W. Lam, Macromolecules, 10, 1307 (1977) and J. V. Crivello, Ann. Rev. Mater. Sci. 1983, 13, pages 173-190 and J. V. Crivello, Journal of Polymer Science, Part A: Polymer Chemistry, Vol. 37, 4241-4254 (1999).

In certain cases it may be of advantage to use mixtures of two or more photoinitiators.

Halogen is fluorine, chlorine, bromine and iodine.

$C_1$-$C_{24}$alkyl ($C_1$-$C_{20}$alkyl, especially $C_1$-$C_{12}$alkyl) is typically linear or branched, where possible. Examples are methyl, ethyl, n-propyl, isopropyl, n-butyl, sec.-butyl, isobutyl, tert.-butyl, n-pentyl, 2-pentyl, 3-pentyl, 2,2-dimethylpropyl, 1,1,3,3-tetramethylpentyl, n-hexyl, 1-methylhexyl, 1,1,3,3,5,5-hexamethylhexyl, n-heptyl, isoheptyl, 1,1,3,3-tetramethylbutyl, 1-methylheptyl, 3-methylheptyl, n-octyl, 1,1,3,3-tetramethylbutyl and 2-ethylhexyl, n-nonyl, decyl, undecyl, dodecyl, tridecyl, tetradecyl, pentadecyl, hexadecyl, heptadecyl, or octadecyl. $C_1$-$C_8$alkyl is typically methyl, ethyl, n-propyl, isopropyl, n-butyl, sec.-butyl, isobutyl, tert.-butyl, n-pentyl, 2-pentyl, 3-pentyl, 2,2-dimethyl-propyl, n-hexyl, n-heptyl, n-octyl, 1,1,3,3-tetramethylbutyl and 2-ethylhexyl. $C_1$-$C_4$alkyl is typically methyl, ethyl, n-propyl, isopropyl, n-butyl, sec.-butyl, isobutyl, tert.-butyl.

$C_2$-$C_{12}$alkenyl ($C_2$-$C_5$alkenyl) groups are straight-chain or branched alkenyl groups, such as e.g. vinyl, allyl, methallyl, isopropenyl, 2-butenyl, 3-butenyl, isobutenyl, n-penta-2,4-dienyl, 3-methyl-but-2-enyl, n-oct-2-enyl, or n-dodec-2-enyl.

$C_1$-$C_{12}$alkoxy groups ($C_1$-$C_8$alkoxy groups) are straight-chain or branched alkoxy groups, e.g. methoxy, ethoxy, n-propoxy, isopropoxy, n-butoxy, sec-butoxy, tert-butoxy, amyloxy, isoamyloxy or tert-amyloxy, heptyloxy, octyloxy, isooctyloxy, nonyloxy, decyloxy, undecyloxy and dodecyloxy.

$C_1$-$C_{12}$alkylthio groups ($C_1$-$C_8$ alkylthio groups) are straight-chain or branched alkylthio groups and have the same preferences as the alkoxy groups, except that oxygen is exchanged against sulfur.

$C_1$-$C_{12}$alkylene is bivalent $C_1$-$C_{12}$alkyl, i.e. alkyl having two (instead of one) free valencies, e.g. trimethylene or tetramethylene.

A cycloalkyl group is typically $C_3$-$C_8$cycloalkyl, such as, for example, cyclopentyl, cyclohexyl, cycloheptyl, or cyclooctyl, which may be unsubstituted or substituted.

In several cases it is advantageous to in addition to the photoinitiator employ a sensitizer compound. Examples of suitable sensitizer compounds are disclosed in WO 06/008251, page 36, line 30 to page 38, line 8, the disclosure of which is hereby incorporated by reference. As sensitizer inter alia benzophenone compounds as described above can be employed.

The unsaturated compounds may include one or more olefinic double bonds. They may be of low (monomeric) or high (oligomeric) molecular mass. Examples of monomers containing a double bond are alkyl, hydroxyalkyl or amino acrylates, or alkyl, hydroxyalkyl or amino methacrylates, for example methyl, ethyl, butyl, 2-ethylhexyl or 2-hydroxyethyl acrylate, isobornyl acrylate, methyl methacrylate or ethyl methacrylate. Silicone acrylates are also advantageous. Other examples are acrylonitrile, acrylamide, methacrylamide, N-substituted (meth)acrylamides, vinyl esters such as vinyl acetate, vinyl ethers such as isobutyl vinyl ether, styrene, alkyl- and halostyrenes, N-vinylpyrrolidone, vinyl chloride or vinylidene chloride.

Examples of monomers containing two or more double bonds are the diacrylates of ethylene glycol, propylene glycol, neopentyl glycol, hexamethylene glycol or of bisphenol A, and 4,4'-bis(2-acryl-oyloxyethoxy)diphenylpropane, trimethylolpropane triacrylate, pentaerythritol triacrylate or tetraacrylate, vinyl acrylate, divinylbenzene, divinyl succinate, diallyl phthalate, triallyl phosphate, triallyl isocyanurate or tris(2-acryloylethyl) isocyanurate.

Examples of polyunsaturated compounds of relatively high molecular mass (oligomers) are acrylated epoxy resins, polyesters containing acrylate-, vinyl ether- or epoxy-groups, and also polyurethanes and polyethers. Further examples of unsaturated oligomers are unsaturated polyester resins, which are usually prepared from maleic acid, phthalic acid and one or more diols and have molecular weights of from about 500 to 3000. In addition it is also possible to employ vinyl ether monomers and oligomers, and also maleate-terminated oligomers with polyester, polyurethane, polyether, polyvinyl ether and epoxy main chains. Of particular suitability are combinations of oligomers which carry vinyl ether groups and of polymers as described in WO90/01512. However, copolymers of vinyl ether and maleic acid-functionalized monomers are also suitable. Unsaturated oligomers of this kind can also be referred to as prepolymers.

Particularly suitable examples are esters of ethylenically unsaturated carboxylic acids and polyols or polyepoxides, and polymers having ethylenically unsaturated groups in the chain or in side groups, for example unsaturated polyesters, polyamides and polyurethanes and copolymers thereof, polymers and copolymers containing (meth)acrylic groups in side chains, and also mixtures of one or more such polymers.

Examples of unsaturated carboxylic acids are acrylic acid, methacrylic acid, crotonic acid, itaconic acid, cinnamic acid, and unsaturated fatty acids such as linolenic acid or oleic acid.

Acrylic and methacrylic acid are preferred.

Suitable polyols are aromatic and, in particular, aliphatic and cycloaliphatic polyols. Examples of aromatic polyols are hydroquinone, 4,4'-dihydroxydiphenyl, 2,2-di(4-hydroxyphenyl)propane, and also novolaks and resols. Examples of polyepoxides are those based on the above-mentioned polyols, especially the aromatic polyols, and epichlorohydrin. Other suitable polyols are polymers and copolymers containing hydroxyl groups in the polymer chain or in side groups, examples being polyvinyl alcohol and copolymers thereof or polyhydroxyalkyl methacrylates or copolymers thereof. Further polyols which are suitable are oligoesters having hydroxyl end groups.

Examples of aliphatic and cycloaliphatic polyols are alkylenediols having preferably 2 to 12 C atoms, such as ethylene glycol, 1,2- or 1,3-propanediol, 1,2-, 1,3- or 1,4-butanediol, pentanediol, hexanediol, octanediol, dodecanediol, diethylene glycol, triethylene glycol, polyethylene glycols having molecular weights of preferably from 200 to 1500, 1,3-cyclopentanediol, 1,2-, 1,3- or 1,4-cyclohexanediol, 1,4-dihydroxymethylcyclohexane, glycerol, tris(p-hydroxyethyl)amine, trimethylolethane, trimethylolpropane, pentaerythritol, dipentaerythritol and sorbitol.

The polyols may be partially or completely esterified with one carboxylic acid or with different unsaturated carboxylic acids, and in partial esters the free hydroxyl groups may be modified, for example etherified or esterified with other carboxylic acids.

Examples of esters are: trimethylolpropane triacrylate, trimethylolethane triacrylate, trimethylolpropane trimethacrylate, trimethylolethane trimethacrylate, tetramethylene glycol dimethacrylate, triethylene glycol dimethacrylate, tetraethylene glycol diacrylate, tripropylene glycol diacrylate (TPGDA), dipropylene glycol diacrylate (DPGDA), pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol pentaacrylate, dipentaerythritol hexaacrylate, tripentaerythritol octaacrylate, pentaerythritol dimethacrylate, pentaerythritol trimethacrylate, dipentaerythritol dimethacrylate, dipentaerythritol tetramethacrylate, tripentaerythritol octamethacrylate, pentaerythritol diitaconate, dipentaerythritol tris-itaconate, dipentaerythritol pentaitaconate, dipentaerythritol hexaitaconate, ethylene glycol diacrylate, 1,3-butanediol diacrylate, 1,3-butanediol dimethacrylate, 1,4-butanediol diitaconate, sorbitol triacrylate, sorbitol tetraacrylate, pentaerythritol-modified triacrylate, sorbitol tetra methacrylate, sorbitol pentaacrylate, sorbitol hexaacrylate, oligoester acrylates and methacrylates, glycerol diacrylate and triacrylate, 1,4-cyclohexane diacrylate, bisacrylates and bismethacrylates of polyethylene glycol with a molecular weight of from 200 to 1500, or mixtures thereof. Also suitable as polymerizable components are triacrylate of singly to viginuply alkoxylated, more preferably singly to viginuply ethoxylated trimethylolpropane, singly to viginuply propoxylated glycerol or singly to viginuply ethoxylated and/or propoxylated pentaerythritol, such as, for example, ethoxylated trimethylol propane triacrylate (TMEOPTA).

Also suitable as polymerizable components are the amides of identical or different, unsaturated carboxylic acids with aromatic, cycloaliphatic and aliphatic polyamines having preferably 2 to 6, especially 2 to 4, amino groups.

Examples of such polyamines are ethylenediamine, 1,2- or 1,3-propylenediamine, 1,2-, 1,3- or 1,4-butylenediamine, 1,5-pentylenediamine, 1,6-hexylenediamine, octylenediamine, dodecylenediamine, 1,4-diaminocyclohexane, isophoronediamine, phenylenediamine, bisphenylenediamine, di-ß-aminoethyl ether, diethylenetriamine, triethylenetramine, di(ß-aminoethoxy)- or di(ß-aminopropoxy)ethane. Other suitable polyamines are polymers and copolymers, preferably with additional amino groups in the side chain, and oligoamides having amino end groups. Examples of such unsaturated amides are methylenebisacrylamide, 1,6-hexamethylenebisacrylamide, diethylenetriaminetrismethacrylamide, bis(methacrylamido-propoxy)ethane, ß-methacrylamidoethyl methacrylate and N[(ß-hydroxy-ethoxy)ethyl]acrylamide.

Suitable unsaturated polyesters and polyamides are derived, for example, from maleic acid and from diols or diamines. Some of the maleic acid can be replaced by other dicarboxylic acids. They can be used together with ethylenically unsaturated comonomers, for example styrene. The polyesters and polyamides may also be derived from dicarboxylic acids and from ethylenically unsaturated diols or diamines, especially from those with relatively long chains of, for example 6 to 20 C atoms. Examples of polyurethanes are those composed of saturated or unsaturated diisocyanates and of unsaturated or, respectively, saturated diols.

Polymers with (meth)acrylate groups in the side chain are likewise known. They may, for example, be reaction products of epoxy resins based on novolaks with (meth)acrylic acid, or may be homo- or copolymers of vinyl alcohol or hydroxyalkyl derivatives thereof which are esterified with (meth)acrylic acid, or may be homo- and copolymers of (meth)acrylates which are esterified with hydroxyalkyl (meth)acrylates.

Other suitable polymers with acrylate or methacrylate groups in the side chains are, for example, solvent soluble or alkaline soluble polyimide precursors, for example poly (amic acid ester) compounds, having the photopolymerizable side groups either attached to the backbone or to the ester groups in the molecule, i.e. according to EP624826. Such oligomers or polymers can be formulated with optionally reactive diluents, like polyfunctional (meth)acrylates in order to prepare highly sensitive polyimide precursor resists.

Examples of polymerizable components are also polymers or oligomers having at least two ethylenically unsaturated groups and at least one carboxyl function within the molecule structure, such as a resin obtained by the reaction of a saturated or unsaturated polybasic acid anhydride with a product of the reaction of an epoxy compound and an unsaturated monocarboxylic acid, for example, photosensitive compounds as described in JP 10-301276 and commercial products such as for example EB9696, UCB Chemicals; KAYARAD TCR1025, Nippon Kayaku Co., LTD., NK OLIGO EA-6340, EA-7440 from Shin-Nakamura Chemical Co., Ltd., or an addition product formed between a carboxyl group-containing resin and an unsaturated compound having an α,β-unsaturated double bond and an epoxy group (for example, ACA200M, Daicel Industries, Ltd.). Additional commercial products as examples of polymerizable component are ACA200, ACA210P, ACA230AA, ACA250, ACA300, ACA320 from Daicel Chemical Industries, Ltd.

The polymerizable compound, may also comprise urethane (meth)acrylates, epoxy (meth)acrylates or carbonate (meth)acrylates.

Urethane (meth)acrylates are obtainable for example by reacting polyisocyanates with hydroxyalkyl (meth)acrylates and optionally chain extenders such as diols, polyols, diamines, polyamines, dithiols or polythiols.

The urethane (meth)acrylates preferably have a number-average molar weight $M_n$ of 500 to 20 000, in particular of 500 to 10 000 and more preferably 600 to 3000 g/mol (determined by gel permeation chromatography using tetrahydrofuran and polystyrene as standard).

The urethane (meth)acrylates preferably have a (meth)acrylic group content of 1 to 5, more preferably of 2 to 4, mol per 1000 g of urethane (meth)acrylate.

Epoxy (meth)acrylates are obtainable by reacting epoxides with (meth)acrylic acid. Examples of suitable epoxides include epoxidized olefins, aromatic glycidyl ethers or aliphatic glycidyl ethers, preferably those of aromatic or aliphatic glycidyl ethers.

Examples of possible epoxidized olefins include ethylene oxide, propylene oxide, isobutylene oxide, 1-butene oxide, 2-butene oxide, vinyloxirane, styrene oxide or epichlorohydrin, preference being given to ethylene oxide, propylene oxide, isobutylene oxide, vinyloxirane, styrene oxide or epichlorohydrin, particular preference to ethylene oxide, propylene oxide or epichlorohydrin, and very particular preference to ethylene oxide and epichlorohydrin.

Aromatic glycidyl ethers are, for example, bisphenol A diglycidyl ether, bisphenol F diglycidyl ether, bisphenol B diglycidyl ether, bisphenol S diglycidyl ether, hydroquinone diglycidyl ether, alkylation products of phenol/dicyclopentadiene, e.g., 2,5-bis[(2,3-epoxypropoxy)phenyl]octahydro-4,7-methano-5H-indene (CAS No. [13446-85-0]), tris[4-(2,3-epoxypropoxy)phenyl]methane isomers (CAS No. [66072-39-7]), phenol-based epoxy novolaks (CAS No. [9003-35-4]), and cresol-based epoxy novolaks (CAS No. [37382-79-9]).

Examples of aliphatic glycidyl ethers include 1,4-butanediol diglycidyl ether, 1,6-hexanediol diglycidyl ether, trimethylolpropane triglycidyl ether, pentaerythritol tetraglycidyl ether, 1,1,2,2-tetrakis[4-(2,3-epoxypropoxy)phenyl] ethane (CAS No. [27043-37-4]), diglycidyl ether of polypropylene glycol (α,ω-bis(2,3-epoxypropoxy)poly (oxypropylene), CAS No. [16096-30-3]) and of hydrogenated bisphenol A (2,2-bis[4-(2,3-epoxypropoxy)cyclohexyl]propane, CAS No. [13410-58-7]).

The epoxy (meth)acrylates preferably have a number-average molar weight $M_n$ of 200 to 20 000, more preferably of 200 to 10 000 g/mol, and very preferably of 250 to 3000 g/mol (determined by gel permeation chromatography using polystyrene as standard and tetrahydrofuran as eluent); the amount of (meth)acrylic groups is preferably 1 to 5, more preferably 2 to 4, per 1000 g of epoxy (meth)acrylate.

Carbonate (meth)acrylates comprise on average preferably 1 to 5, especially 2 to 4, more preferably 2 to 3 (meth)acrylic groups, and very preferably 2 (meth)acrylic groups.

The number-average molecular weight $M_n$ of the carbonate (meth)acrylates is preferably less than 3000 g/mol, more preferably less than 1500 g/mol, very preferably less than 800 g/mol (determined by gel permeation chromatography using polystyrene as standard, tetrahydrofuran as solvent).

The carbonate (meth)acrylates are obtainable in a simple manner by transesterifying carbonic esters with polyhydric, preferably dihydric, alcohols (diols, hexanediol for example) and subsequently esterifying the free OH groups with (meth)acrylic acid, or else by transesterification with (meth)acrylic esters, as described for example in EP-A 92 269. They are also obtainable by reacting phosgene, urea derivatives with polyhydric, e.g., dihydric, alcohols.

Also conceivable are (meth)acrylates of polycarbonate polyols, such as the reaction product of one of the aforementioned diols or polyols and a carbonic ester and also a hydroxyl-containing (meth)acrylate.

Examples of suitable carbonic esters include ethylene carbonate, 1,2- or 1,3-propylene carbonate, dimethyl carbonate, diethyl carbonate or dibutyl carbonate.

Examples of suitable hydroxyl-containing (meth)acrylates are 2-hydroxyethyl (meth)acrylate, 2- or 3-hydroxypropyl (meth)acrylate, 1,4-butanediol mono(meth)acrylate, neopentyl glycol mono(meth)acrylate, glyceryl mono- and di(meth)acrylate, trimethylolpropane mono- and di(meth) acrylate, and pentaerythritol mono-, di-, and tri(meth)acrylate.

Particularly preferred carbonate (meth)acrylates are those of the formula:

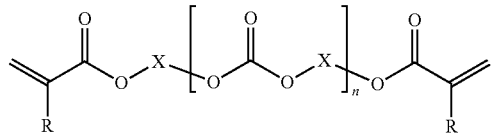

in which R is H or $CH_3$, X is a $C_2$-$C_{18}$ alkylene group, and n is an integer from 1 to 5, preferably 1 to 3.

R is preferably H and X is preferably $C_2$ to $C_{10}$ alkylene, examples being 1,2-ethylene, 1,2-propylene, 1,3-propylene, 1,4-butylene, and 1,6-hexylene, more preferably $C_4$ to $C_8$ alkylene. With very particular preference X is $C_6$ alkylene.

The carbonate (meth)acrylates are preferably aliphatic carbonate (meth)acrylates.

As diluent, a mono- or multi-functional ethylenically unsaturated compound, or mixtures of several of said compounds, can be included in the above composition up to 70% by weight based on the solid portion of the composition.

The invention also provides compositions comprising as polymerizable component at least one ethylenically unsaturated photopolymerizable compound which is emulsified or dissolved in water, or organic solvents.

The printing, or coating composition may comprise various additives. Examples thereof include thermal inhibitors, coinitiators and/or sensitizers, light stabilisers, optical brighteners, fillers and pigments, as well as white and coloured pigments, dyes, antistatics, wetting agents, flow auxiliaries, lubricants, waxes, anti-adhesive agents, dispersants, emulsifiers, anti-oxidants; fillers, e.g. talcum, gypsum, silicic acid, rutile, carbon black, zinc oxide, iron oxides; reaction accelerators, thickeners, matting agents, antifoams, leveling agents and other adjuvants customary, for example, in lacquer, ink and coating technology.

Examples of coinitiators/sensitisers are especially aromatic carbonyl compounds, for example benzophenone, thioxanthone, especially isopropyl thioxanthone, anthraquinone and 3-acylcoumarin derivatives, terphenyls, styryl ketones, and also 3-(aroylmethylene)-thiazolines, camphor quinone, and also eosine, rhodamine and erythrosine dyes. Amines, for example, can also be regarded as photosensitisers when the photoinitiator consists of a benzophenone or benzophenone derivative.

Examples of light stabilizers are:

Phosphites and phosphonites (processing stabilizer), for example triphenyl phosphite, diphenylalkyl phosphites, phenyldialkyl phosphites, tris(nonylphenyl) phosphite, trilauryl phosphite, trioctadecyl phosphite, distearylpentaerythritol diphosphite, tris(2,4-di-tert-butylphenyl) phosphite, diisodecyl pentaerythritol diphosphite, bis(2,4-di-tert-butylphenyl)pentaerythritol diphosphite, bis(2,4-di-cumylphenyl) pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl)methyl phosphite, bis(2,4-di-tert-butyl-6-methylphenyl)ethyl phosphite, 6-fluoro-2,4,8,10-tetra-tert-butyl-12-methyl-dibenz[d,g]-1,3,2-dioxaphosphocin, 2,2',2''-nitrilo[triethyltris(3,3',5,5'-tetra-tert-butyl-1,1'-biphenyl-2,2'-diyl)phosphite], 2-ethylhexyl (3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane, phosphorous acid, mixed 2,4-bis(1,1-dimethylpropyl)phenyl and 4-(1,1-dimethylpropyl)phenyl triesters (CAS No. 939402-02-5), Phosphorous acid, triphenyl ester, polymer with alpha-hydro-omega-hydroxypoly[oxy (methyl-1,2-ethanediyl)], C10-16 alkyl esters (CAS No. 1227937-46-3). The following phosphites are especially preferred: Tris(2,4-di-tert-butylphenyl) phosphite, tris(nonylphenyl) phosphite,

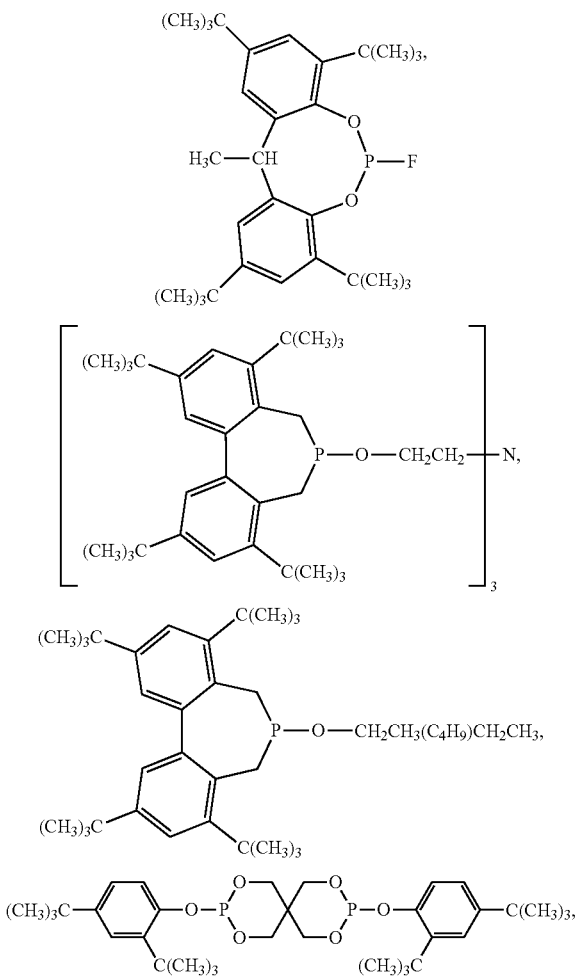

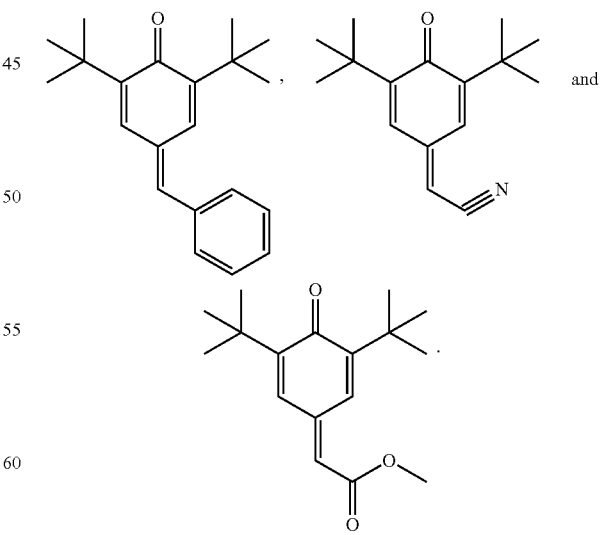

Quinone Methide of the Formula (providing long term shelf life stability), wherein
$R^{21}$ and $R^{22}$ independently of each other are $C_1$-$C_{18}$alkyl, $C_5$-$C_{12}$cycloalkyl, $C_7$-$C_{15}$-phenylalkyl, optionally substituted $C_6$-$C_{10}$aryl;

$R^{23}$ and $R^{24}$ independently of each other are H, optionally substituted $C_6$-$C_{10}$-aryl, 2-,3-,4-pyridyl, 2-,3-furyl or thienyl, COOH, COOR$^{25}$, CONH$_2$, CONHR$^{25}$, CONR$^{25}$R$^{26}$, —CN, —COR$^{25}$, —OCOR$^{25}$, —OPO(OR$^{25}$)$_2$, wherein $R^{25}$ and $R^{26}$ are independently of each other $C_1$-$C_8$alkyl, or phenyl. Quinone methides are preferred, wherein $R^{21}$ and $R^{22}$ are tert-butyl;

$R^{23}$ is H, and $R^{24}$ is optionally substituted phenyl, COOH, COOR$^{25}$, CONH$_2$, CONHR$^{25}$, CONR$^{25}$R$^{26}$, —CN, —COR$^{25}$, —OCOR$^{25}$, —OPO(OR$^{25}$)$_2$, wherein $R^{25}$ and $R^{26}$ are $C_1$-$C_8$alkyl, or phenyl. Examples of quinone methides are The quinone methides may be used in combination with highly sterically hindered nitroxyl radicals as described, for example, in US20110319535.

The quinone methides are used typically in a proportion of from about 0.01 to 0.3% by weight, preferably from about 0.04 to 0.15% by weight, based on the total weight of the UV curable composition.

Leveling agents used, which additionally also serve to improve scratch resistance, can be the products TEGO® Rad 2100, TEGO® Rad 2200, TEGO® Rad 2300, TEGO® Rad 2500, TEGO® Rad 2600, TEGO® Rad 2700 and TEGO® Twin 4000, likewise obtainable from Tego. Such auxiliaries are obtainable from BYK, for example as BYK®-300, BYK®-306, BYK®-307, BYK®-310, BYK®-320, BYK®-322, BYK®-331, BYK®-333, BYK®-337, BYK®-341, Byk® 354, Byk® 361 N, BYK®-378 and BYK®-388.

Leveling agents are typically used in a proportion of from about 0.005 to 1.0% by weight, preferably from about 0.01 to 0.2% by weight, based on the total weight of the UV curable composition.

The coating, or printing ink compositions of the present invention may be used for the production of decorative, or security elements.

Accordingly, the present application relates to security, or decorative elements, comprising a substrate, which may contain indicia or other visible features in or on its surface, and and on at least part of the said substrate surface, a coating, comprising the composition according to the present invention.

The coating, comprising the composition according to the present invention, shows a blue color in transmission and a metallic yellow color in reflection.

Due to the simple buildup of the security element and the specific highest maximum absorption wavelength of the silver nanoplatelets a high protection against counterfeit is possible, making the element ideally suitable for banknotes, credit cards and the like.

As substrate the usual substrates can be used. The substrate may comprise paper, leather, fabric such as silk, cotton, tyvac, filmic material or metal, such as aluminium. The substrate may be in the form of one or more sheets or a web. The substrate may be mould made, woven, nonwoven, cast, calendared, blown, extruded and/or biaxially extruded. The substrate may comprise paper, fabric, manmade fibres and polymeric compounds. The substrate may comprise any one or more selected from the group comprising paper, papers made from wood pulp or cotton or synthetic wood free fibres and board. The paper/board may be coated, calendared or machine glazed; coated, uncoated, mould made with cotton or denim content, Tyvac, linen, cotton, silk, leather, polythyleneterephthalate, Propafilm® polypropylene, polyvinylchloride, rigid PVC, cellulose, triacetate, acetate polystyrene, polyethylene, nylon, acrylic and polyetherimide board. The polyethyleneterephthalate substrate may be Melinex type film (obtainable from DuPont Films Willimington Del., such as, for example, product ID Melinex HS-2), or oriented polypropylene.

The substrates being transparent films or non-transparent substrates like opaque plastic, paper including but not limited to banknote, voucher, passport, and any other security or fiduciary documents, self-adhesive stamp and excise seals, card, tobacco, pharmaceutical, computer software packaging and certificates of authentication, aluminium, and the like.

The substrates can be plain such as in metallic (e.g. Al foil) or plastic foils (e.g. PET foil), but paper is regarded also as a plain substrate in this sense.

Non-plain substrates or structured substrates comprise a structure, which was intentionally created, such as a hologram, or any other structure, created, for example, by embossing.

In a particularly preferred embodiment, the composition, comprising silver nanoplatelets with the highest wavelength absorption maximum being within the range of 560 to 800 nm, when measured in water dispersion, may be used in combination with compositions, comprising silver nanoplatelets with different highest wavelength absorption maximums to print dichromic, or trichromic patterns. Compositions, comprising silver nanoplatelets with different highest wavelength absorption maximum, i.e. having a highest wavelength absorption maximum being within the range of 800 to 1200 nm and showing a different color in transmission and reflection were described, for example, in WO11064162. Compositions, comprising silver nanoplatelets having a highest wavelength absorption maximum being within the range of 450 to 550 nm and showing a red, or magenta color in transmission and a greenish-metallic color in reflection; are described, for example, in EP18202669.0. In a particularly preferred embodiment a coating comprises areas with different silver nanoparticle compositions. The different areas may have a defined shape, such as, for example, a symbol, a stripe, a geometrical shape, a design, lettering, an alphanumeric character, the representation of an object or parts thereof.

The coating (or layer), comprising the composition according to the present invention, which shows a blue color in transmission and a metallic yellow color in reflection, can be used as functional semitransparent and/or metallic layer in known decorative, or security elements, which are, for example, described in WO2011/064162, WO2014/041121, WO2014/187750, WO15120975A1, WO16091381A1, WO16173696, WO2017114590, WO2017092865, WO2017080641, WO2017028950, WO2017008897, WO2016173695 WO17054922A1 and WO17008905A3.

Accordingly, the present invention relates to
a security, or decorative element (the structure of which is described in more detail in WO2014/041121), comprising a) a substrate, b) a component with refractive index modulation, in particular a volume hologram, which is obtainable by exposing a recording material to actinic radiation and thereon c) a coating on at least a portion of the refractive index modulated layer, comprising the composition according to the present invention, which shows a blue color in transmission and a metallic yellow color in reflection;
a security element (the structure of which is described in more detail in WO2014/187750), comprising
a) a substrate
b) a coating on at least a portion of the substrate comprising at least one liquid crystal compound, the coating being applied,
on the reverse side of the substrate if the substrate is transparent or translucent or on the surface side if the substrate is transparent, translucent, reflective or opaque and
c) a further coating on at least a portion of the coating containing the liquid crystal compound or direct on the substrate if the coating containing the liquid crystal compound is placed on the reverse side of the substrate, the further coating comprising the composition according to the present invention, which shows a blue color in transmission and a metallic yellow color in reflection;
a security element (the structure of which is described in more detail in WO16173696) for security papers, value documents, or the like, which consists of a multilayer structure capable of interference, wherein the multilayer structure capable of interference has a reflection layer, a dielectric layer, and a partially transparent layer, wherein the dielectric layer is arranged between the reflection layer and the partially transparent layer, wherein the reflection layer is formed by a colored layer, comprising the composition according to the present invention, which shows a blue color in transmission and a metallic yellow color in reflection;

a security element (the structure of which is described in more detail in WO2017092865) for protecting documents of value, comprising a transparent carrier substrate, a layer containing a diffractive optical element (DOE) and a semi-transparent functional layer, comprising the composition according to the present invention, which shows a blue color in transmission and a metallic yellow color in reflection;

a molded plastic film article (the structure of which is described in more detail in WO2017114590) for a blister, in particular a blister for tablets, comprising a transparent carrier substrate that includes a semi-transparent functional layer, comprising the composition according to the present invention, which shows a blue color in transmission and a metallic yellow color in reflection;

a packaging (the structure of which is described in more detail in WO17054922A1) comprising a plastic film shaped part and a cover film, wherein said plastic film shaped part defines the front side of the packaging and the cover film defines the rear side of the packaging, and the cover film is based on a carrier substrate provided with a semi-transparent functional layer, comprising the composition according to the present invention, which shows a blue color in transmission and a metallic yellow color in reflection.

The method of producing the security element of the present invention comprises preferably the steps of
a) providing a substrate having a surface, which surface may contain indicia or other visible features, such as for example polyethylene terephthalate (PET) film, or a biaxially oriented polypropylene (BOPP) film;
b) applying on top of at least part of the said substrate surface a composition according to the present invention, comprising the silver nanoplatelets, and
c) optionally applying a protective layer on top of layer (b).

The application of layer b) and/or c) is preferably done by gravure, flexographic, ink jet, offset, or screen printing process.

The protective layer (c) is applied on top of layer (b). The protective layer is preferably transparent or translucent. Examples for coatings are known to the skilled person. For example, water borne coatings, UV-cured coatings or laminated coatings may be used.

UV-cured coatings are preferably derived from UV curable compositions which are preferably deposited by means of gravure, offset flexographic, ink jet and screen printing process.

The UV curable composition comprises
(a) 1.0 to 20.0, especially 1.0 to 15.0, very especially 3.0 to 10.0% by weight of photoinitiator,
(b) 99.0 to 80.0, especially 99.0 to 85.0, very especially 97.0 to 90.0% by weight of a binder (unsaturated compound(s) including one or more olefinic double bonds), wherein the sum of components a) and b) adds up to 100%.

In a preferred embodiment the UV curable composition comprises an epoxy-acrylate (10 to 60%) and one or several (monofunctional and multifunctional) acrylates (20 to 90%) and one, or several photoinitiators (1 to 15%).

The epoxy-acrylate is selected from aromatic glycidyl ethers aliphatic glycidyl ethers. Aromatic glycidyl ethers are, for example, bisphenol A diglycidyl ether, bisphenol F diglycidyl ether, bisphenol B diglycidyl ether, bisphenol S diglycidyl ether, hydroquinone diglycidyl ether, alkylation products of phenol/dicyclopentadiene, e.g., 2,5-bis[(2,3-epoxypropoxy)phenyl]octahydro-4,7-methano-5H-indene (CAS No. [13446-85-0]), tris[4-(2,3-epoxypropoxy)phenyl] methane isomers (CAS No. [66072-39-7]), phenol-based epoxy novolaks (CAS No. [9003-35-4]), and cresol-based epoxy novolaks (CAS No. [37382-79-9]). Examples of aliphatic glycidyl ethers include 1,4-butanediol diglycidyl ether, 1,6-hexanediol diglycidyl ether, trimethylolpropane triglycidyl ether, pentaerythritol tetraglycidyl ether, 1,1,2,2-tetrakis[4-(2,3-epoxypropoxy)phenyl]ethane (CAS No. [27043-37-4]), diglycidyl ether of polypropylene glycol (α,ω-bis(2,3-epoxypropoxy)poly(oxypropylene), CAS No. [16096-30-3]) and of hydrogenated bisphenol A (2,2-bis[4-(2,3-epoxypropoxy)cyclohexyl]propane, CAS No. [13410-58-7]).

The one or several acrylates are preferably multifunctional monomers which are selected from trimethylolpropane triacrylate, trimethylolethane triacrylate, trimethylolpropane trimethacrylate, trimethylolethane trimethacrylate, tetramethylene glycol dimethacrylate, triethylene glycol dimethacrylate, tetraethylene glycol diacrylate, tripropylene glycol diacrylate (TPGDA), dipropylene glycol diacrylate (DPGDA), pentaerythritol diacrylate, pentaerythritol triacrylate, pentaerythritol tetraacrylate, dipentaerythritol diacrylate, dipentaerythritol triacry¬late, dipentaerythritol tetraacrylate, dipentaerythritol pentaacrylate, dipentaerythritol hexa¬acrylate, tripentaerythritol octaacrylate, pentaerythritol dimethacrylate, pentaerythritol trimethacrylate, dipentaerythritol dimethacrylate, dipentaerythritol tetramethacrylate, tripentaerythritol octamethacrylate, pentaerythritol diitaconate, dipentaerythritol tris-itaconate, dipentaerythritol pentaitaconate, dipentaerythritol hexaitaconate, ethylene glycol diacrylate, 1,3-butanediol diacrylate, 1,3-butanediol dimethacrylate, 1,4-butanediol diitaconate, sorbitol triacrylate, sorbitol tetraacrylate, pentaerythritol-modified triacrylate, sorbitol tetra methacrylate, sorbitol pentaacrylate, sorbitol hexaacrylate, oligoester acrylates and methacrylates, glycerol diacrylate and triacrylate, 1,4-cyclohexane diacrylate, bisacrylates and bismethacrylates of polyethylene glycol with a molecular weight of from 200 to 1500, triacrylate of singly to vigintuply alkoxylated, more preferably singly to vigintuply ethoxylated trimethylolpropane, singly to vigintuply propoxylated glycerol or singly to vigintuply ethoxylated and/or propoxylated pentaerythritol, such as, for example, ethoxylated trimethylol propane triacrylate (TMEOPTA) and or mixtures thereof.

In another preferred embodiment the UV curable composition comprises:

| | |
|---|---|
| Bisphenol A epoxyacrylate with 25% TPGDA | 1-35% by weight |
| Dipropylene glycol diacrylate (DPGDA) | 30-45% by weight |
| Ethoxylated trimethylol propane triacrylate (TMEOPTA) | 10-50% by weight |

| | |
|---|---|
| Reactive tertiary amine | 1-15% by weight |
| Photoinitiator: | 5-10% by weight |

In another preferred embodiment the UV curable composition comprises:

| | |
|---|---|
| Tripropylene glycol diacrylate (TPGDA) | 1-25% by weight |
| Dipropylene glycol diacrylate (DPGDA) | 30-45% by weight |
| Ethoxylated trimethylol propane triacrylate (TMEOPTA) | 10-50% by weight |
| Reactive tertiary amine | 1-15% by weight |
| Photoinitiator: | 5-9% by weight |

The photoinitiator is preferably a blend of an alpha-hydroxy ketone, alpha-alkoxyketone or alpha-aminoketone compound of the formula (XI) and a benzophenone compound of the formula (X); or a blend of an alpha-hydroxy ketone, alpha-alkoxyketone or alpha-aminoketone compound of the formula (XI), a benzophenone compound of the formula (X) and an acylphosphine oxide compound of the formula (XII).

The UV curable composition may comprise various additives. Examples thereof include thermal inhibitors, coinitiators and/or sensitizers, light stabilisers, optical brighteners, fillers and pigments, as well as white and coloured pigments, dyes, antistatics, wetting agents, flow auxiliaries, lubricants, waxes, anti-adhesive agents, dispersants, emulsifiers, antioxidants; fillers, e.g. talcum, gypsum, silicic acid, rutile, carbon black, zinc oxide, iron oxides; reaction accelerators, thickeners, matting agents, antifoams, leveling agents and other adjuvants customary, for example, in lacquer, ink and coating technology.

Examples of coinitiators/sensitisers are especially aromatic carbonyl compounds, for example benzophenone, thioxanthone, especially isopropyl thioxanthone, anthraquinone and 3-acylcoumarin derivatives, terphenyls, styryl ketones, and also 3-(aroylmethylene)-thiazolines, camphor quinone, and also eosine, rhodamine and erythrosine dyes. Amines, for example, can also be regarded as photosensitisers when the photoinitiator consists of a benzophenone or benzophenone derivative.

The security element of the invention can be affixed to a variety of objects through various attachment mechanisms, such as pressure sensitive adhesives or hot stamping processes, to provide for enhanced security measures such as anticounterfeiting. The security article can be utilized in the form of a label, a tag, a ribbon, a security thread, and the like, for application to a variety of objects such as security documents, monetary currency, credit cards, merchandise, etc.

Accordingly, the present invention is also directed to a product, comprising the security element according to the present invention, and to the use of the security element according to the present invention for the prevention of counterfeit or reproduction, on a document of value, right, identity, a security label or a branded good.

A method of detecting the authenticity of the security element according to the present invention may comprise the steps of:
a) measuring an absorbance, reflectance or transmittance spectrum of the security document in the VIS/NIR range of the electromagnetic spectrum; and
b) comparing the spectrum measured under a) and/or information derived therefrom with a corresponding spectrum and/or information of an authentic security element.

The composition of the present invention can used in methods for forming an optically variable image (an optically variable device), which are, for example, described in EP2886343A1, EP2886343A1, EP2886356B1, WO11064162, WO2013/186167, WO14118567A1

Accordingly, the present invention relates to
a method for forming an optically variable image (an optically variable device) on a substrate comprising the steps of: forming an optically variable image (OVI) on a discrete portion of the substrate; and depositing a coating, or a printing composition, comprising the composition according to the present invention on at least a portion of the OVI;
a method for forming a surface relief microstructure, especially an optically variable device on a substrate comprising the steps of:
A) applying a curable composition to at least a portion of the frontside of the substrate;
B) contacting at least a portion of the curable composition with the surface relief microstructure, especially optically variable image forming means;
C) curing the composition by using at least one UV lamp which is arranged on the backside of the substrate;
D) depositing the composition according to the present invention on at least a portion of the cured composition;
a method for forming a surface relief microstructure, especially an optically variable image (an optically variable device, OVD) on a substrate described in WO2013/186167 comprises the steps of:
A) applying a curable composition to at least a portion of the substrate wherein the curable composition comprises
a1) at least one ethylenically unsaturated resin, a monomer or a mixture thereof;
a2) at least one photoinitiator; and
a3) the composition according to the present invention;
B) contacting at least a portion of the curable composition with a surface relief microstructure, especially optically variable image forming means;
C) curing the composition by using at least one UV lamp.

The following examples are intended to illustrate various aspects and features of the present invention.

EXAMPLES

UV-Vis spectra of dispersions were recorded on Varian Cary 50 UV-Visible spectrophotometer at such concentration of dispersions as to achieve the optical density of 0.3 to 1.5 at 1 cm optical path.

TEM analysis of dispersions and coatings was performed on EM 910 instrument from ZEISS in bright field mode at an e-beam acceleration voltage of 100 kV. At least 2 representative images with scale in different magnification were recorded in order to characterize the dominant particle morphology for each sample.

The diameter of the particles was determined from TEM images as maximum dimension of nanoplatelets, oriented parallel to the plane of the image, using Fiji image analysis software, based on the measurement of at least 300 randomly selected particles.

The thickness of the particles was measured manually as the maximum dimension of nanoplatelets, oriented perpendicular to the plane of the image, from a TEM image, based on the measurement of at least 50 randomly selected particles.

Example 1 a) In a 1 L double-wall glass reactor, equipped with anchor-stirrer, 365 g of de-ionized water was cooled to +2° C. 13.62 g of sodium borohydride was added, and the mixture was cooled to −1° C. with stirring at 250 rounds per minute (RPM, Solution A).

In a 0.5 L double-wall glass reactor, equipped with anchor-stirrer, 132 g of deionized water and 4.8 g of MPEG-5000-thiol were combined, and the mixture was stirred for 10 minutes at room temperature. 72 g of the product of Example A3 of WO2006074969 was added, and the resulting mixture was stirred for another 10 minutes at room temperature for homogenization. The solution of 30.6 g of silver nitrate in 30 g of de-ionized water was added in one portion and the mixture was stirred for 10 minutes, resulting in an orange-brown viscous solution. To this solution 96 g of deionized water was added, followed by addition of 3 g of Struktol SB2080 defoamer, pre-dispersed in 36 g of de-ionized water. The resulting mixture was cooled to 0° C. with stirring at 250 RPM (Solution B).

After that, Solution B was dosed with a peristaltic pump at a constant rate over 2 h into Solution A under the liquid surface via a cooled (0° C.) dosing tube, resulting in spherical silver nanoparticles dispersion. During pumping, the Solution A was stirred at 250 RPM.

After dosing was complete, the reaction mixture was warmed up to +5° C. within 15 minutes, and a solution of 862 mg of KCl in 10 g of deionized water was added in one portion, followed by addition of 9.6 g of ethylenediaminetetraacetic acid (EDTA) in 4 equal portions with 10 minutes time intervals.

After addition of the last EDTA portion, the reaction mixture was stirred for 15 minutes at +5° C., then warmed up to 35° C. over 30 minutes and stirred for 1 h at this temperature. Upon this time, hydrogen evolution is completed.

3.0 mL of 30% w/w solution of ammonia in water was added, followed by addition of 5.76 g of solid NaOH, and the mixture was stirred for 15 min at 35° C. Then 180 mL of 50% w/w hydrogen peroxide solution in water were dosed with a peristaltic pump at a constant rate over 4 h into the reaction mixture under the liquid surface with stirring at 250 RPM, while maintaining the temperature at 35° C. This has led to a deep blue colored dispersion of silver nanoplatelets, which was cooled to room temperature. 1.23 g of compound of formula

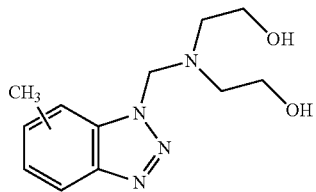

(B-3)

was added, and the mixture was stirred for 1 h at room temperature.

b) Isolation and Purification of Ag Nanoplatelets
b1) Decantation 9.6 g of sodium dodecylsulfate was added to the reaction mixture and then ca. 25 g of anhydrous sodium sulfate powder was added in portions with stirring until the transmission color of the dispersion changed from blue to pink. Then the mixture was kept without stirring at room temperature for 24 h, allowing the coagulated nanoplatelets to sediment at the bottom of the reactor.

890 g of supernatant was pumped out from the reactor with a peristaltic pump, and 890 g of deionized water was added to the reactor. The mixture in reactor was stirred for 1 h at room temperature, allowing the coagulated particles to re-disperse.

b2) Decantation

Ca. 64 g of anhydrous sodium sulfate powder was added in portions with stirring until the transmission color of the dispersion changed from blue to yellowish-pink. Then the mixture was kept without stirring at room temperature for 12 h, allowing the coagulated nanoplatelets to sediment at the bottom of the reactor. 990 g of supernatant was pumped out from the reactor with a peristaltic pump, and 90 g of deionized water was added to the reactor. The resulting mixture was stirred for 30 minutes at room temperature, allowing the coagulated particles to re-disperse.

b3) Ultrafiltration in Water

The resulting dispersion of Ag nanoplatelets was subjected to ultrafiltration using a Millipore Amicon 8400 stirred ultrafiltration cell. The dispersion was diluted to 400 g weight with de-ionized water and ultrafiltered to the end volume of ca. 50 mL using a polyethersulfone (PES) membrane with 300 kDa cut-off value. The procedure was repeated in total 4 times to provide 60 g of Ag nanoplatelets dispersion in water. After ultrafiltration was completed, 0.17 g of compound (B-3) was added to the dispersion.

Ag content 28.9% w/w; yield ca. 89% based on total silver amount; Solids content (at 250° C.) 33.5% w/w; Purity 86% w/w of silver based on solids content at 250° C.

b4) Ultrafiltration in Isopropanol

The dispersion was further ultrafiltered in isopropanol. 60 g of Ag nanoplatelets dispersion, obtained after ultrafiltration in water, was placed in a Millipore Amicon 8400 stirred ultrafiltration cell and diluted to 300 g weight with isopropanol. The dispersion was ultrafiltered to the volume of ca. 50 mL using a polyethersulfone (PES) membrane with 500 kDa cut-off value. The procedure was repeated in total 4 times to provide 72 g of Ag nanoplatelets dispersion in isopropanol.

Ag content 24.1% w/w; Solids content (at 250° C.) 25.7% w/w; Purity 93.5% w/w of silver based on solids content at 250° C.

The UV-Vis-NIR spectrum was recorded in water at Ag concentration of $9.8*10^5$ M. $\lambda_{max}$=700 nm; extinction coefficient at maximum E=10200 L/(cm*mol Ag), FWHM=340 nm. Reference is made to FIG. 1. UV-Vis-NIR spectrum of Ag nanoplatelets from Example 1 b4). Number mean particle diameter 93+40 nm, number mean particle thickness 16±2.5 nm.

b5) Solvent Switch 50 g of Ag nanoplatelets dispersion after ultrafiltration in isopropanol was placed into 250 mL round-bottom flask and 15 g of ethyl 3-ethoxypropionate was added. The resulting mixture was concentrated on rotary evaporator at 40 mbar pressure and 40° C. bath temperature, till no more solvent was distilled off. The solids content was adjusted to 40% w/w by addition of ethyl 3-ethoxypropionate.

The invention claimed is:

1. A composition, comprising silver nanoplatelets, wherein the mean diameter of the silver nanoplatelets, present in the composition, is in the range of 50 to 150 nm with standard deviation being less than 60% and the mean thickness of the silver nanoplatelets, present in the composition, is in the range of 5 to 30 nm with standard deviation being less than 50%, wherein the mean aspect ratio of the silver nanoplatelets is higher than 2.0 and the highest wavelength absorption maximum of the population of all silver nanoplatelets in the composition being within the range of 560 to 800 nm, and wherein a molar extinction coefficient of silver nanoplatelets, measured at the highest wavelength absorption maximum of the population of all silver nanoplatelets in the composition, is higher than 4000 L/(cm*mol$_{Ag}$)).

2. The composition according to claim 1, wherein the silver nanoplatelets bear a surface stabilizing agent of formula

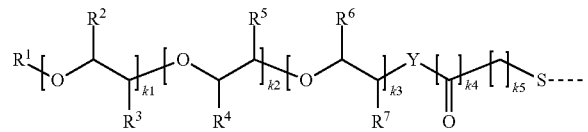

(I)

on their surface, wherein
$R^1$ is H, $C_1$-$C_{18}$alkyl, phenyl, $C_1$-$C_8$alkylphenyl, or $CH_2COOH$;
$R^2$, $R^3$, $R^4$, $R^5$, $R^6$ and $R^7$ are independently of each other H, $C_1$-$C_8$alkyl, or phenyl;
Y is O, or $NR^8$;
$R^8$ is H, or $C_1$-$C_8$alkyl;
k1 is an integer in the range of from 1 to 500,
k2 and k3 are independently of each other 0, or integers in the range of from 1 to 250;
k4 is 0, or 1,
k5 is an integer in the range of from 1 to 5.

3. The composition according to claim 1, wherein the silver nanoplatelets bear a surface stabilizing agent which is a polymer, or copolymer, which is obtained by a process comprising the steps
i1) polymerizing in a first step one or more ethylenically unsaturated monomers in the presence of at least one nitroxylether having the structural element

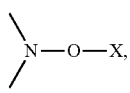

wherein X represents a group having at least one carbon atom and is such that the free radical X• derived from X is capable of initiating polymerization; or
i2) polymerizing in a first step one or more ethylenically unsaturated monomers in the presence of at least one stable free nitroxyl radicals

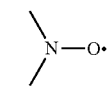

and a free radical initiator; wherein at least one monomer used in the steps i1) or i2) is a $C_1$-$C_6$alkyl or hydroxy$C_1$-$C_6$alkyl ester of acrylic or methacrylic acid; and optionally
ii) a second step, comprising the modification of the polymer or copolymer prepared under i1) or i2) by a transesterification reaction, an amidation, hydrolysis or anhydride modification or a combination thereof.

4. The composition according to claim 2, wherein $R^1$ is H, or $C_1$-$C_8$alkyl;

$R^2$, $R^3$, $R^4$, $R^5$, $R^6$ and $R^7$ are independently of each other H, or $CH_3$; Y is O, or $NR^8$;
$R^8$ is H, or $C_1$-$C_8$alkyl; k1 is 22 to 450; k2 and k3 are independently of each other 0, or integers in the range of from 1 to 100; k4 is 0; k5 is an integer in the range of from 1 to 4.

5. The composition according to claim 4, wherein the surface stabilizing agent is of formula

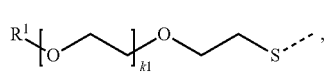

(Ia)

wherein
$R^1$ is H, or a $C_1$-$C_8$alkyl group, and
k1 is 22 to 450.

6. The composition according to claim 1, which comprises one, or more stabilizing agents selected from the group consisting of compounds of formula

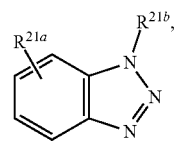

(IIb)

wherein
$R^{21a}$ is a hydrogen atom, a halogen atom, a $C_1$-$C_8$alkoxy group, or a $C_1$-$C_8$alkyl group,
$R^{21b}$ is a hydrogen atom, or a group of formula —$CHR^{24}$—$N(R^{22})$ ($R^{23}$),
$R^{22}$ and $R^{23}$ are independently of each other a $C_1$-$C_8$alkyl, a hydroxy$C_1$-$C_8$alkyl group, or a group of formula —$[(CH_2CH_2)$—$O]_{n1}$—$CH_2CH_2$—OH, wherein n1 is 1 to 5,
$R^{24}$ is H or $C_1$-$C_8$alkyl, and compounds of formula

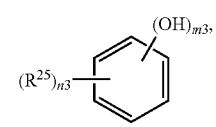

(IIc)

wherein
$R^{25}$ can be the same, or different in each occurrence and is a hydrogen atom, a halogen atom, a $C_1$-$C_{18}$alkyl group, a $C_1$-$C_{18}$alkoxy group, or a group —C(=O)—$R^{26}$,
$R^{26}$ is a hydrogen atom, a hydroxy group, a $C_1$-$C_{18}$alkyl group, unsubstituted or substituted amino group, unsubstituted or substituted phenyl group, or a $C_1$-$C_{18}$alkoxy group, and
n3 is a number of 1 to 4,
m3 is a number of 2 to 4, and
the sum of m3 and n3 is 6.

7. A coating, or printing ink composition, comprising the composition according to claim 1.

8. The coating, or printing ink composition according to claim 7, further comprising a binder.

9. A security, or decorative element, comprising a substrate, which may contain indicia or other visible features in or on its surface, and on at least part of the said substrate surface, a coating, comprising the composition according to claim 1.

10. The security, or decorative element according to claim 9, wherein the coating, shows a blue color in transmission and a metallic yellow color in reflection.

11. The security, or decorative element according to claim 9, wherein the security element comprises a substrate, a coating on at least a portion of the substrate comprising at least one liquid crystal compound, the coating being applied on the reverse side of the substrate if the substrate is transparent or translucent or on the surface side if the substrate is transparent, translucent, reflective or opaque and a further coating on at least a portion of the coating containing the liquid crystal compound or direct on the substrate if the coating containing the liquid crystal compound is placed on the reverse side of the substrate, the further coating comprising silver nanoplatelets, wherein the mean diameter of the silver nanoplatelets, present in the composition, is in the range of 50 to 150 nm with standard deviation being less than 60% and the mean thickness of the silver nanoplatelets, present in the composition, is in the range of 5 to 30 nm with standard deviation being less than 50%, wherein the mean aspect ratio of the silver nanoplatelets is higher than 2.0 and the highest wavelength absorption maximum of the population of all silver nanoplatelets in the composition being within the range of 560 to 800 nm; or the security element consists of a multilayer structure capable of interference, wherein the multilayer structure capable of interference has a reflection layer, a dielectric layer, and a partially transparent layer, wherein the dielectric layer is arranged between the reflection layer and the partially transparent layer, wherein the reflection layer is formed by a colored layer, comprising silver nanoplatelets, wherein the mean diameter of the silver nanoplatelets, present in the composition, is in the range of 50 to 150 nm with standard deviation being less than 60% and the mean thickness of the silver nanoplatelets, present in the composition, is in the range of 5 to 30 nm with standard deviation being less than 50%, wherein the mean aspect ratio of the silver nanoplatelets is higher than 2.0 and the highest wavelength absorption maximum of the population of all silver nanoplatelets in the composition being within the range of 560 to 800 nm; or the security element comprises a transparent carrier substrate, a layer containing a diffractive optical element (DOE) and a semi-transparent functional layer, comprising silver nanoplatelets, wherein the mean diameter of the silver nanoplatelets, present in the composition, is in the range of 50 to 150 nm with standard deviation being less than 60% and the mean thickness of the silver nanoplatelets, present in the composition, is in the range of 5 to 30 nm with standard deviation being less than 50%, wherein the mean aspect ratio of the silver nanoplatelets is higher than 2.0 and the highest wavelength absorption maximum of the population of all silver nanoplatelets in the composition being within the range of 560 to 800 nm; or the security, or decorative element is a blister for tablets, comprising a transparent carrier substrate that includes a semi-transparent functional layer, comprising silver nanoplatelets, wherein the mean diameter of the silver nanoplatelets, present in the composition, is in the range of 50 to 150 nm with standard deviation being less than 60% and the mean thickness of the silver nanoplatelets, present in the composition, is in the range of 5 to 30 nm with standard deviation being less than 50%, wherein the mean aspect ratio of the silver nanoplatelets is higher than 2.0 and the highest wavelength absorption maximum of the population of all silver nanoplatelets in the composition being within the range of 560 to 800 nm; or the security, or decorative element is a packaging comprising a plastic film shaped part and a cover film, wherein said plastic film shaped part defines the front side of the packaging and the cover film defines the rear side of the packaging, and the cover film is based on a carrier substrate provided with a semi-transparent functional layer, comprising silver nanoplatelets, wherein the mean diameter of the silver nanoplatelets, present in the composition, is in the range of 50 to 150 nm with standard deviation being less than 60% and the mean thickness of the silver nanoplatelets, present in the composition, is in the range of 5 to 30 nm with standard deviation being less than 50%, wherein the mean aspect ratio of the silver nanoplatelets is higher than 2.0 and the highest wavelength absorption maximum of the population of all silver nanoplatelets in the composition being within the range of 560 to 800 nm.

12. A product, comprising the security or decorative element according to claim 9.

13. A method comprising providing the security or decorative element according to claim 9 and including the security or decorative element in an article for the prevention of counterfeit or reproduction, on a document of value, right, identity, a security label or a branded good.

14. A process for producing the composition according to claim 1, comprising the silver nanoplatelets, which comprises:

(a) preparing a solution (a) comprising a silver precursor, a compound of formula

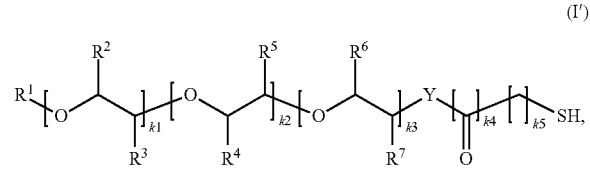

(I′)

wherein $R^1$ is H, $C_1$-$C_{18}$alkyl, phenyl, $C_1$-$C_8$alkylphenyl, or $CH_2COOH$;

$R^2$, $R^3$, $R^4$, $R^5$, $R^6$ and $R^7$ are independently of each other H, $C_1$-$C_8$alkyl, or phenyl;

Y is O, or $NR^8$;

$R^8$ is H, or $C_1$-$C_8$alkyl;

k1 is an integer in the range of from 1 to 500, k2 and k3 are independently of each other 0, or integers in the range of from 1 to 250;

k4 is 0, or 1, k5 is an integer in the range of from 1 to 5;

and a polymer, or copolymer which is obtained by a process comprising the steps i1) polymerizing in a first step one or more ethylenically unsaturated monomers in the presence of at least one nitroxylether having the structural element

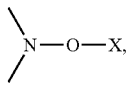

wherein X represents a group having at least one carbon atom and is such that the free radical X• derived from X is capable of initiating polymerization; or i2) polymerizing in a first step one or more ethylenically unsaturated monomers in the presence of at least one stable free nitroxyl radical

and a free radical initiator; wherein at least one monomer used in the steps i1) or i2) is a $C_1$-$C_6$alkyl or hydroxy$C_1$-$C_6$alkyl ester of acrylic or methacrylic acid; and optionally ii) a second step, comprising the modification of the polymer or copolymer prepared under i1) or i2) by a transesterification reaction, an amidation, hydrolysis or anhydride modification or a combination thereof; water, and optionally a defoamer;

(b1) preparing a solution (b), comprising a reducing agent, which comprises at least one boron atom in the molecule, and water;

(b2) adding solution (a) to solution (b), and adding one or more complexing agents;

(c) adding a hydrogen peroxide solution in water; and (d) optionally adding a surface stabilization agent to the mixture obtained in step (c), thereby synthesizing the composition, comprising the silver nanoplatelets.

15. The coating, or printing ink composition according to claim 7, further comprising:
a binder; and
a solvent.

* * * * *